(12) United States Patent
Kim et al.

(10) Patent No.: US 10,244,551 B2
(45) Date of Patent: Mar. 26, 2019

(54) SCHEDULING OF DELAY SENSITIVE CONVERGECAST NETWORK

(71) Applicant: Mitsubishi Electric Research Laboratories, Inc., Cambridge, MA (US)

(72) Inventors: Kyeongjin Kim, Lexington, MA (US); Daoud Burghal, Cambridge, MA (US); Jianlin Guo, Newton, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 28 days.

(21) Appl. No.: 15/591,181

(22) Filed: May 10, 2017

(65) Prior Publication Data
US 2018/0332601 A1   Nov. 15, 2018

(51) Int. Cl.
*H04J 3/14* (2006.01)
*H04W 72/12* (2009.01)
(Continued)

(52) U.S. Cl.
CPC ..... *H04W 72/1242* (2013.01); *H04L 43/0864* (2013.01); *H04L 45/02* (2013.01);
(Continued)

(58) Field of Classification Search
None
See application file for complete search history.

(56) References Cited

U.S. PATENT DOCUMENTS

| 8,005,002 B2 | 8/2011 | Gandham et al. |
| 2006/0120371 A1 * | 6/2006 | Huang ............... H04L 45/02 370/392 |

(Continued)

FOREIGN PATENT DOCUMENTS

EP    1780951 A2 *   5/2007   ........ H04W 52/0219

OTHER PUBLICATIONS

H. Zhang, P. Soldati, and M. Johansson, "Performance Bounds and Latency-Optimal Scheduling for Convergecast in WirelessHART Networks," in IEEE Transactions on Wireless Communications, vol. 12, No. 6, pp. 2688-2696, Jun. 2013.

(Continued)

*Primary Examiner* — Kwang B Yao
*Assistant Examiner* — Juvena W Loo
(74) *Attorney, Agent, or Firm* — Gene Vinokur; James McAleenan; Hironori Tsukamoto

(57) ABSTRACT

A method determining scheduling for packet transmission in a convergecast network. The method includes receiving a request to perform an operation in the network. Initializing a query from the sink-node, the query is transmitted to a plurality of nodes, and in response to the query, the receiver receives information indicative at a period of time. Sorting the nodes by the sink-node based on the received information and using a sorting function that prioritizes each node to obtain a prioritized order of the nodes. Calculating an end-to-end delay for each node based on the time data by determining a difference between the data generation release time for each node and the data delivery time at the sink-node for each node. Scheduling packet transmission for each of the nodes based on a scheduling function having a set of predetermined scheduling criteria. Performing packet transmissions in the tree using the scheduled order.

18 Claims, 19 Drawing Sheets

(51) Int. Cl.
*H04L 12/733* (2013.01)
*H04L 12/751* (2013.01)
*H04L 12/26* (2006.01)
*H04W 28/02* (2009.01)
*H04W 84/18* (2009.01)

(52) U.S. Cl.
CPC ......... *H04L 45/20* (2013.01); *H04W 28/0278* (2013.01); *H04W 72/121* (2013.01); *H04W 72/1221* (2013.01); *H04W 72/1252* (2013.01); *H04W 84/18* (2013.01)

(56) References Cited

U.S. PATENT DOCUMENTS

| | | | | |
|---|---|---|---|---|
| 2007/0140149 | A1* | 6/2007 | Gandham | H04L 43/00 370/255 |
| 2008/0112387 | A1* | 5/2008 | Gandhann | H04L 12/1881 370/345 |
| 2015/0036570 | A1* | 2/2015 | Jeong | H04W 52/0216 370/311 |

OTHER PUBLICATIONS

D. Durmaz Incel, A. Ghosh, B. Krishnamachari, and K Chintalapudi, "Fast Data Collection in Tree-Based Wireless Sensor Networks," in IEEE Transactions on Mobile Computing, vol. 11, No. 1, pp. 86-99, Jan. 2012.

A. Saifullah, Y. Xu, C. Lu, and Y. Chen, "Real-Time Scheduling for WirelessHART Networks," Real-Time Systems Symposium (RTSS), 2010 IEEE 31st, San Diego, CA, 2010, pp. 150-159.

Macfarland et al. "A Testbed for Autonomous Racecar Control Strategies." Student Thesis (BA) Advisors: Everbach, Carr; Zucker, Matt. Swarthmore College. Dept. of Engineering. 2015.

Paul Alan Theodosis, "Path Planning for an Automated Vehicle Using Professional Racing Techniques." A Dissertation Submitted to the Department of Mechanical Engineering and the Committee on Graduate Studies of Stanford University in Partial Fulfillment of the Requirements for the Degree of Doctor of Philosophy. Aug. 2014.

Ozlem Durmaz Incel et al., "Scheduling Algorithms for Tree Based Data Collection in Wireless Sensor Networks." In: Theoretical Aspects of Distributed Computing in Sensor Networks, Jan. 1, 2011, Springer, Verlag,m Berlin, Heidelberg. pp. 407-445.

* cited by examiner

SCHEDULING OF DELAY SENSITIVE CONVERGECAST NETWORK

FIELD

The present disclosure relates generally to delay sensitive scheduling in wireless multi-hop convergecast networks, and more particularly scheduling schemes that jointly minimize schedule size and end-to-end delay in non-uniform release time environments.

BACKGROUND

Wireless sensor network (WSN) is an important component of the Internet of Things (IoT) effort. It provides seamless connectivity and control capabilities to surrounding infrastructure and facilities. It also provides access to real world data through measuring and monitoring the environment. However, applications with stringent reliability constrains have not fully adopted the WSN. For instance, delay is a major concern in many manufacturing and other sensitive facilities. In such environment, sensor nodes must convey the data to the sink node in the monitoring center as soon as it becomes available. Such data collection could be periodic or aperiodic process. Once the data is available from all or subset of the nodes, the control center may choose the appropriate action.

Thus, it is necessary to develop specialized networks that are capable of accommodating applications with a strict delay and reliability requirements. Recently, several standards have been developed to address some issues that improve the reliability of WSN such as interference, delay, and integration with current and future standards. For instance, WirelessHart and 802.15.4e provide MAC layer that uses TDMA, where the scheduling time is divided into periodic intervals, called time-slots, and frequency hopping (FH) to combat delay and interference. All nodes are assumed to have a synchronized time clock so that they know the starting and finishing times of each slot.

U.S. Pat. No. 8,005,002 B2 assumes that the data is available at all the nodes at the beginning of the scheduling. However, this assumption is not satisfied in industrial and other delay sensitive applications. Furthermore, the U.S. Pat. No. 8,005,002 B2 prior work focuses on the schedule size. However, minimizing the schedule size in the constrained non-uniform release time does not minimize the end-to-end delay.

Therefore, there is a need to address scheduling schemes that address the delay sensitive scheduling problem in wireless multi-hop convergecast networks and many-to-one networks.

SUMMARY

The present disclosure relates generally to delay sensitive scheduling in wireless multi-hop many-to-one network, which is also referenced as convergecast networks, and more particularly scheduling schemes that jointly minimize schedule size and end-to-end delay in non-uniform release time environments.

The delay sensitive scheduling in wireless multi-hop many-to-one network include a sink node, that is also known as a base-station or a gateway, and a plurality of data nodes. Each data node collects or generates data. At least one aspect of each data node is to transmit the data to the sink node, possibly through other data nodes, i.e. nodes, with a minimum delay. The time data is collected or generated and could be different for different nodes depending upon the specific embodiment of the present disclosure.

The present disclosure is based on several realizations that include addressing minimizing the schedule size and end-to-end delay simultaneously. In particular, we understand delay is a major concern in many manufacturing and other sensitive facilities. We looked to address overcoming the problems in convergecast network to accommodate for applications requiring a strict delay and a certain level of reliability requirements. At least one important feature of a scheduling scheme for packet transmission according to the present disclosure is to collect all data with a small number of time slots, i.e., a small schedule size. However, the schedule size may not reflect the true delay. For instance, we discovered that in an application where data is available at different nodes in different time instances, the schedule size does not represent the actual delay. For example, a network in an industrial setting, can include a sink node, and a set of wireless nodes, wherein each node is attached to a process that can be attached to another process. Each process can release data at a given time, such that the release times for each node could be different for each process. In other words, one process can have a larger value than a time of that of another process releases data. Wherein, according to embodiments of the present disclosure, we focus on cases when release times are not equal, which is also termed non-uniform release times.

In such cases, where release times for multiple processes are not equal, the difference between the time data that is released and it's delivered time is a meaningful metric according to the present disclosure. This quantity is referred to as an end-to-end delay, or a relative delay.

We discovered that minimizing the end-to-end delay for all traffic is challenging task. Thus, we figured out that minimizing a maximum or an average end-to-end delay along with the schedule size can demonstrate good results according to the present disclosure. In addition, a small schedule size is also an important feature of a scheduling scheme in many scenarios according to the present disclosure, and can provide for a duration for parodic procedures in an industrial setting. Wherein we consider the schedule size that can be defined as number of time slots to collect all data.

In these types of networks, we realized through experimentation the scheduling scheme jointly minimizes the schedule size and end-to-end delay in non-uniform release time environment. To this end, a joint sorting and scheduling can be developed. We figured out that the sink node can sort the nodes based on a given criterion, and then can schedule the nodes to achieve at least two objectives; first a minimum schedule size and second, a minimum end-to-end delay.

Another realization we realized in designing scheduling schemes is that the load of nodes is an important metric when prioritizing the transmission of nodes. For example, according to an embodiment of the present disclosure, the sink node sorts the nodes based on a particular metric. In a particular implementation, the nodes can be sorted based on the total load or the remaining load. In another implementation, the nodes can be divided into two groups: (i) child nodes of the sink node and (ii) other nodes except the child nodes of the sink node. Then, the nodes in each of the two groups can be sorted based on a particular metric, wherein the first group is prioritized over the second group.

The sink node schedules the nodes with high priority to transmit or receive depending on some condition. In a particular implementation, if the node has at least one packet in its buffer, then the node is scheduled to transmit. If the node's buffer is empty, the node schedules one of its child nodes depending on the scheduling rule. In one implementation of this rule according to the present disclosure, a child node i with an oldest packet is scheduled to transmit, unless there is another child node j with a larger load and has at least one packet within d timeslots, from the oldest packet in the buffer of node i.

In another implementation according to the present disclosure, if node k has a non-empty buffer that is occupied by $b_k$ packets, then the node can be scheduled to receive, only if, one of its child nodes have an older packet according to the scheduling rule $F(b_k)$, where $F(b_k)$ is a function that depends on a buffer size of node k, $b_k$.

In another implementation according to an embodiment of the present disclosure, the link to node k or from node k can be scheduled on a current time-frequency resource if no other conflicting links are scheduled on the same block. Otherwise, the link to node k or from node k is scheduled on a different frequency channel if available. If not, scheduling the link is deferred. In another implementation, sorting of the nodes can be local, such that each node knows scheduling orders of itself and its neighbor nodes. In such case, the scheduling of a node with high priority can be done in similar fashion as earlier. In other words, a node with high priority decides either to transmit or receive according to the scheduling rule.

Further still, in another implementation of the present disclosure, may include the load of a node representing an effective load of that node. The effective load can be the maximum number of packets that is expected to pass through the node in a given time window W.

It is possible other embodiments of the present disclosure can be structured differently, for example, one embodiment can have a Small Schedule Size, that prioritizes the nodes with a large load reduces the schedule size. Another embodiment may have a Small End-to-End Delay, by choosing a child node with the old packet reduces the end-to-end delay without increasing the schedule size. Further still, another embodiment may be structured that Reduces Buffer Overflow, by using the scheduling rule F(.) provides a tradeoff between the schedule size and end-to-end delay. Wherein, the scheduling rule F(.) constitutes a method to avoid overflow in the buffer. Further, an embodiment may be structured having a Distributed Implementation, wherein the central controller is not required since no global knowledge is required. It is noted that the sink node can act as central controller, so that it controls each node when it receives the data packet from its associated child node or transmits the data packet to its associated parent node.

Examples of some methods and systems of the present disclosure, can include determining scheduling for packet transmission in a convergecast network. Wherein during an operation, each node generates packets to transmit to the sink-node. A receiver of the sink-node can receive information indicative of a topology of the convergecast network that includes a tree having one or more branches. Further, each node in the tree can be associated with a hop count for a route to the sink-node through a specific branch. An initial step can include receiving a request to perform an operation in the convergecast network, then initializing a query from the sink-node. The query can be transmitted to the plurality of nodes through the branches, and in response to the query, the receiver receives information indicative at a period of time. Specifically, the information can include a topology of the convergecast network, properties of each node and time data for each node generated. Wherein the time data is indicative of a data generation release time from each node and a data delivery time at the sink-node for each node. Then, sorting the plurality of nodes by the sink-node based on the received information and using a sorting function that prioritizes each node to obtain a prioritized order of the plurality of nodes. Follow by, calculating an end-to-end delay for each node based on the received time data by determining a difference between the data generation release time for each node and the data delivery time at the sink-node for each node. It is then possible to begin scheduling packet transmission for each of the plurality of nodes by the sink-node, based on a scheduling function having a set of predetermined scheduling criteria, so as to obtain a scheduled order for the plurality of nodes. Thus, performing packet transmissions in the tree can be accomplished using the scheduled order, which results in optimizes the operation by reducing a total number of timeslots required to complete the operation, along with reducing an amount of end-to-end delay for the plurality of nodes in the convergecast network.

According to an embodiment of the disclosure, a method for determining scheduling for packet transmission in a convergecast network. The convergecast network including a sink-node and a plurality of nodes. Wherein during an operation in the convergecast network, each node generates packets to transmit to the sink-node, and a receiver of the sink-node receives information indicative of a topology of the convergecast network that includes a tree having one or more branches. Such that each node in the tree is associated with a hop count for a route to the sink-node through a specific branch. The method including receiving a request to perform an operation in the convergecast network. Initializing a query from the sink-node. The query is transmitted to the plurality of nodes through the branches, and in response to the query, the receiver receives information indicative at a period of time. Such that the information includes a topology of the convergecast network, properties of each node and time data for each node generated indicative of a data generation release time from each node and a data delivery time at the sink-node for each node. Sorting the plurality of nodes by the sink-node based on the received information and using a sorting function that prioritizes each node to obtain a prioritized order of the plurality of nodes. Calculating an end-to-end delay for each node based on the time data by determining a difference between the data generation release time for each node and the data delivery time at the sink-node for each node. Scheduling packet transmission for each of the plurality of nodes by the sink-node based on a scheduling function having a set of predetermined scheduling criteria, so as to obtain a scheduled order for the plurality of nodes. Performing packet transmissions in the tree using the scheduled order. Wherein performing the operation using the scheduled order substantially optimizes the operation by reducing a total number of timeslots required to complete the operation and by reducing an amount of end-to-end delay for the plurality of nodes in the convergecast network.

According to another embodiment of the disclosure, a computer-readable storage medium storing instructions that when executed by a computer cause the computer to perform a method for optimizing packet transmission during an operation in a convergecast network. The convergecast network including a sink-node and a plurality of nodes. Wherein during an operation in the convergecast network, each node generates packets to transmit to the sink-node. A receiver of the sink-node receives information indicative of a topology of the convergecast network that includes a tree having one or more branches. Such that each node in the tree is associated with a hop count for a route to the sink-node through a specific branch. The method including receiving a request to perform an operation in the convergecast network. Initializing a query from the sink-node, wherein the query is transmitted to the plurality of nodes through the branches. In response to the query, the receiver receives information indicative at a period of time. Such that the information includes a topology of the convergecast network, properties of each node and time data for each node that is generated indicative of a data generation release time from each node and a data delivery time at the sink-node for each node. Sorting the plurality of nodes by the sink-node based on the received information and using a sorting function that prioritizes each node to obtain a prioritized order of the plurality of nodes. Calculating an end-to-end delay for each node based on the time data by determining a difference between the data generation release time for each node and the data delivery time at the sink-node for each node. Scheduling packet transmission for each of the plurality of nodes by the sink-node based on a scheduling function having a set of predetermined scheduling criteria, so as to obtain a scheduled order for the plurality of nodes. Performing packet transmissions in the tree using the scheduled order. Wherein the scheduled order substantially optimizes the operation by reducing a total number of timeslots required to complete the operation with reducing an amount of end-to-end delay for the plurality of nodes in the convergecast network. Wherein a timeslot specifies an amount of time.

According to another embodiment of the disclosure, a device that optimizes packet transmission during an operation in a convergecast network. The convergecast network including a sink-node and a plurality of nodes. Wherein during the operation in the convergecast network, each node generates packets to transmit to the sink-node. A receiver of the sink-node receives information indicative of a topology of the convergecast network that includes a tree having one or more branches. Each node in the tree is associated with a hop count for a route to the sink-node through a specific branch. The device including a receiver configured to receive a request to perform the operation in the convergecast network. A processor of the sink-node is configured to initialize a query to broadcast to the plurality of nodes through the branches. In response to the query, the receiver receives information indicative at a period of time. Wherein the information includes a topology of the convergecast network, properties of each node and time data for each node that is generated indicative of a data generation release time from each node and a data delivery time at the sink-node for each node. Sort the plurality of nodes by the sink-node based on the received information and using a sorting function that prioritizes each node to obtain a prioritized order of the plurality of nodes. Calculate an end-to-end delay for each node based on the time data by determining a difference between the data generation release time for each node and the data delivery time at the sink-node for each node. Schedule packet transmission for each of the plurality of nodes by the sink-node based on a scheduling function having a set of predetermined scheduling criteria, so as to obtain a scheduled order for the plurality of nodes. Perform packet transmissions in the tree using the scheduled order, wherein the scheduled order substantially optimizes the operation by reducing a total number of timeslots required to complete the operation with reducing an amount of end-to-end delay for the plurality of nodes in the convergecast network.

Further features and advantages of the present disclosure will become more readily apparent from the following detailed description when taken in conjunction with the accompanying Drawing.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings. The drawings shown are not necessarily to scale, with emphasis instead generally being placed upon illustrating the principles of the presently disclosed embodiments.

Figure 1A:
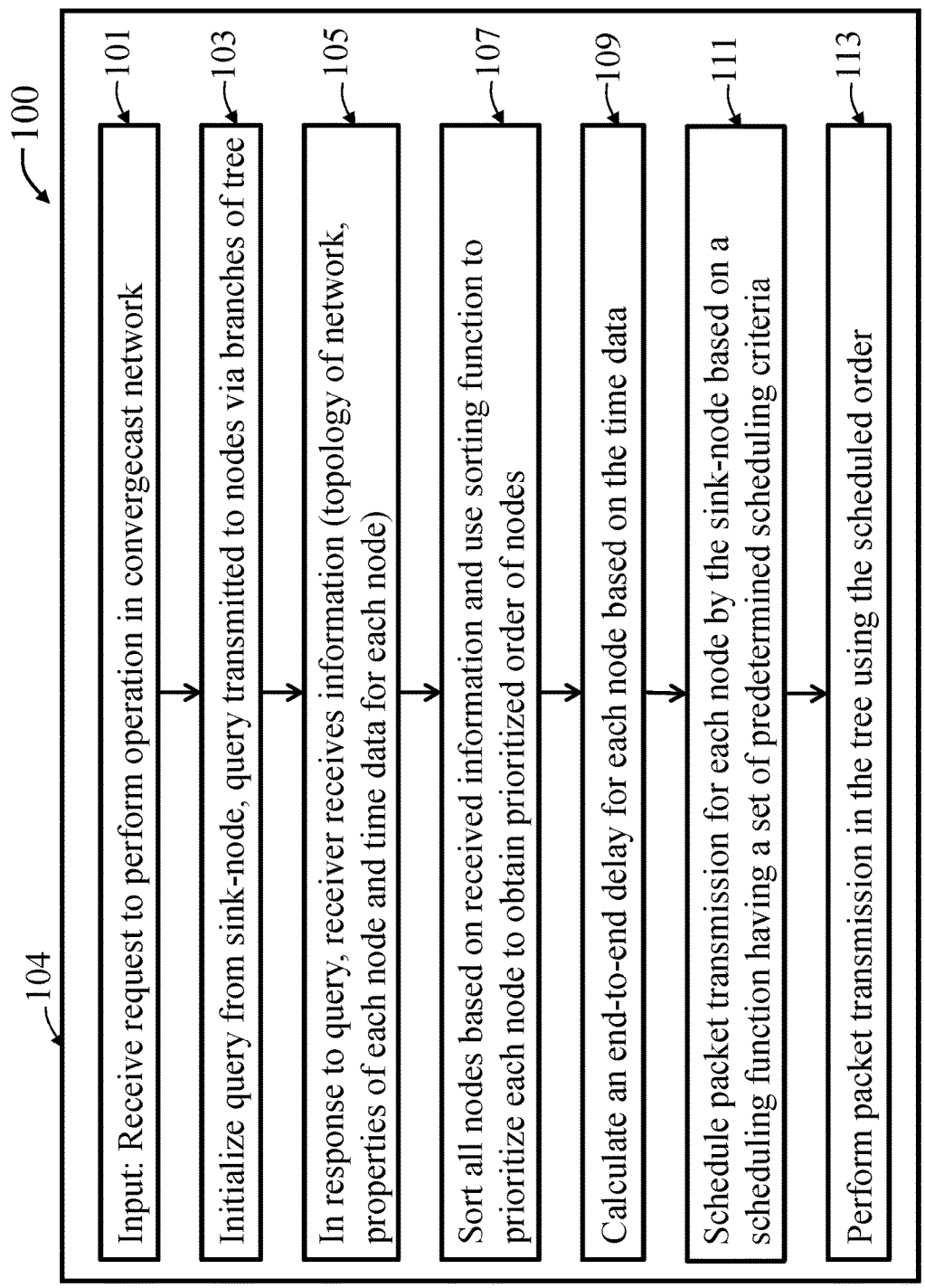
FIG. 1A is a block diagram illustrating method steps for determining scheduling for packet transmission in a convergecast network, according to some embodiments of the present disclosure.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Overview

The present disclosure relates to delay sensitive scheduling in wireless multi-hop many-to-one network, also referenced as convergecast networks, and more particularly scheduling schemes that jointly minimize schedule size and end-to-end delay in non-uniform release time environments.

The delay sensitive scheduling in wireless multi-hop many-to-one network include a sink node, i.e. a base-station or a gateway, and a plurality of data nodes. Each data node collects or generates data, such that each node is to transmit the data to the sink node, possibly through other nodes, with a minimum delay. The time data is collected or generated, and could be different for different nodes depending upon the specific embodiment of the present disclosure.

The present disclosure is based on several realizations that include addressing minimizing the schedule size and end-to-end delay simultaneously. In particular, we understand delay is a major concern in many manufacturing and other sensitive facilities. We looked to address overcoming the problems in convergecast network to accommodate for applications requiring a strict delay and a certain level of reliability requirements. At least one important feature of a scheduling scheme for packet transmission according to the present disclosure is to collect all data with a small number of time slots, i.e., a small schedule size. However, the schedule size may not reflect the true delay. For instance, we discovered that in an application where data is available at different nodes in different time instances, the schedule size does not represent the actual delay. For example, a network in an industrial setting, can include a sink node, and a set of wireless nodes, wherein each node is attached to a process that can be attached to another process. Each process can release data at a given time, such that the release times for each node could be different for each process. In other words, one process can have a larger value than a time of that of another process releases data. Wherein, according to embodiments of the present disclosure, we focus on cases when release times are not equal, which is also termed non-uniform release times.

In such cases, where release times for multiple processes are not equal, the difference between the time data that is released and it's delivered time is a meaningful metric according to the present disclosure. This quantity is referred to as an end-to-end delay, or a relative delay. We discovered that minimizing the end-to-end delay for all traffic is challenging task. Thus, we figured out that minimizing a maximum or an average end-to-end delay along with the schedule size can demonstrate good results according to the present disclosure. In addition, a small schedule size is also an important feature of a scheduling scheme in many scenarios according to the present disclosure, and can provide for a duration for parodic procedures in an industrial setting.

In these types of networks, we realized through experimentation the scheduling scheme jointly minimizes the schedule size and end-to-end delay in non-uniform release time environment. To this end, a joint sorting and scheduling can be developed. We figured out that the sink node can sort the nodes based on a given criterion, and then can schedule the nodes to achieve at least two objectives; first a minimum schedule size and second, a minimum end-to-end delay.

We had another realization in designing scheduling schemes is that the load of nodes is an important metric when prioritizing the transmission of nodes. For example, according to an embodiment of the present disclosure, the sink node sorts the nodes based on a particular metric depending upon the prioritization condition. One particular implementation can include the nodes being sorted based on the total load or the remaining load. In another implementation, the nodes can be divided into two groups: (i) child nodes of the sink node and (ii) other nodes except the child nodes of the sink node. Then, the nodes in each of the two groups can be sorted based on the particular metric, wherein the first group is prioritized over the second group.

The sink node schedules the nodes with high priority to transmit or receive depending on some condition. For example, if the node has at least one packet in its buffer, then the node is scheduled to transmit. If the node's buffer is empty, the node schedules one of its child nodes depending on the scheduling rule. In another implementation of this rule according to the present disclosure is that a child node i with an oldest packet is scheduled to transmit, unless there is another child node j with a larger load and has at least one packet within d timeslots, from the oldest packet in the buffer of node i.

It is also possible another implementation can include that if node k has a non-empty buffer that is occupied by $b_k$ packets, then the node can be scheduled to receive, only if, one of its child nodes have an older packet according to the scheduling rule F ($b_k$), where F ($b_k$) is a function that depends on a buffer size of node k, $b_k$.

We also figured out another implementation that includes the link to node k or from node k can be scheduled on a current time-frequency resource if no other conflicting links are scheduled on the same block. Otherwise, the link to node k or from node k is scheduled on a different frequency channel if available. If not, scheduling the link is deferred. In another implementation, sorting of the nodes can be local, such that each node knows scheduling orders of itself and its neighbor nodes. In such case, the scheduling of a node with high priority can be done in similar fashion as earlier. In other words, a node with high priority decides either to transmit or receive according to the scheduling rule. Further still, in another implementation of the present disclosure, may include the load of a node representing an effective load of that node. The effective load can be the maximum number of packets that is expected to pass through the node in a given time window W.

It is possible other embodiments of the present disclosure can be structured differently, for example, one embodiment can have a Small Schedule Size, that prioritizes the nodes with a large load reduces the schedule size. Another embodiment can have a Small End-to-End Delay, by choosing a child node with the old packet reduces the end-to-end delay without increasing the schedule size. Further still, another embodiment can be structured that Reduces Buffer Overflow, by using the scheduling rule F(.) provides a tradeoff between the schedule size and end-to-end delay. Wherein, the scheduling rule F(.) constitutes a method to avoid overflow in the buffer. Further, an embodiment may be structured having a Distributed Implementation, wherein a central controller is not required since no global knowledge is required. Further, the sink node can act as central controller, so that it controls each node when it receives the data packet from its associated child node or transmits the data packet to its associated parent node.

As noted above, the convergecast network includes a sink-node and a plurality of nodes. Wherein during an operation in the convergecast network, each node generates packets to transmit to the sink-node, and a receiver of the sink-node receives information indicative of a topology of the convergecast network that includes a tree having one or more branches. Such that each node in the tree is associated with a hop count for a route to the sink-node through a specific branch. Further, that the hop-count to the sink-node for each node in the plurality of the nodes is obtained prior to scheduling the packet transmissions. For example, the tree for the convergecast network can be obtained by broadcasting a message from the sink-node to all one-hop neighbors or child nodes of the sink-node. Propagating the message to each node in the plurality of the nodes through forwarding a received copy of the message with a smaller hop-count. Along with obtaining a shortest-hop-count tree to form the tree.

FIG. 1A is a block diagram of method steps for determining scheduling for packet transmission in a convergecast network, according to some embodiments of the present disclosure. The first step 101 of method 100 includes receiving a request to perform an operation in the convergecast network by a processor 104 of a sink-node. Note, the operation begins or starts when a packet is generated from any node of the plurality of the nodes. Further, that each node in the plurality of nodes can be in one of the following states during each timeslot of the operation: a receiving state, during which the node may receive a packet from a neighboring node; a transmitting state, during which the node may transmit a packet to a neighboring node; and an idle state, during which the node neither transmits nor receives.

Then, step 103 includes initializing a query from the sink-node, wherein the query can be transmitted to the plurality of nodes through the branches. Step 105, in response to the query, the receiver receives information indicative at a period of time. Specifically, the information can include a topology of the convergecast network, properties of each node and time data for each node generated. Wherein the time data is indicative of a data generation release time from each node and a data delivery time at the sink-node for each node.

Step 107, sorting all the plurality of nodes by the sink-node based on the received information and using a sorting function that prioritizes each node to obtain a prioritized order of the plurality of nodes. Further, the sorting function can prioritize each node to obtain a prioritized order of the plurality of nodes based on an amount of total load, an amount of load to be forwarded, an amount of load remaining after forwarding, a prioritization of a node, or some combination thereof.

Further still, the sorting function can also prioritize the plurality of nodes based on a total load or a remaining load. Wherein the total load includes a number of packets to be transmitted by each node, a number of packets to be forwarded by each node, or both, in a period of time. Along with including any previous transmitted packets by each node, any previous forwarded packets by each node, or both, in a period of time. Wherein the remaining load is a number of packets each node transmits, forwards, or both, in a remaining of the period of time. Further, it is possible for the sorting function to include a variant implementation function, such that the variant implementation function includes: dividing the plurality of nodes into a first group including child nodes of the sink node, and a second group that includes other nodes except the child nodes of the sink node; and sorting the first group and the second group based on a predetermined metric, such that the first group is prioritized over the second group.

Step 109 includes calculating an end-to-end delay for each node based on the received time data by determining a difference between the data generation release time for each node and the data delivery time at the sink-node for each node. It is noted that the sorting function and the end-to-end delay can be simultaneously or jointly performed.

Step 111 is scheduling packet transmission for each of the plurality of nodes by the sink-node, based on a scheduling function having a set of predetermined scheduling criteria, so as to obtain a scheduled order for the plurality of nodes. Further, the set of predetermined scheduling criteria of the scheduling function includes at least one of a generating time of the packet, a buffer status of a node, a buffer status of a child node and a buffer status of a parent of the node.

Further still, the scheduling function can include computing a generating time difference for each node from the time data between a holding time of an oldest packet of the node and a holding time of an oldest packet held by the node's associated child nodes, such that if the generating time difference is above a predetermined time threshold, then, the oldest packet held by the node's associated child node is scheduled by the sink node to transmit the packet from the child node.

It is possible that the scheduling function can include computing a systematic threshold considering buffer status of associated child nodes' and buffer status of associated parent nodes', such that receive packets from an associated child node or transmit packets to associated parent node. Wherein as the buffer of the parent node is filled with more packets, the threshold is decreased, so that a node is scheduled by the sink node to receive packets from its associated child node.

In other words, as the buffer of the node is filled with more packets, the threshold is increased, so that the node is scheduled by the sink node to transmit its packets inside of the buffer to its associated parent node. Wherein, as buffers of the node and its associated parent node are simultaneously filled with more packets, the sink node prevents the node from transmitting or receiving operation.

Finally, step 113 is performing packet transmissions in the tree which is accomplished using the scheduled order. The results of method 100 optimizes the operation by reducing a total number of timeslots required to complete the operation, along with reducing an amount of end-to-end delay for the plurality of nodes in the convergecast network.

Figure 1B:
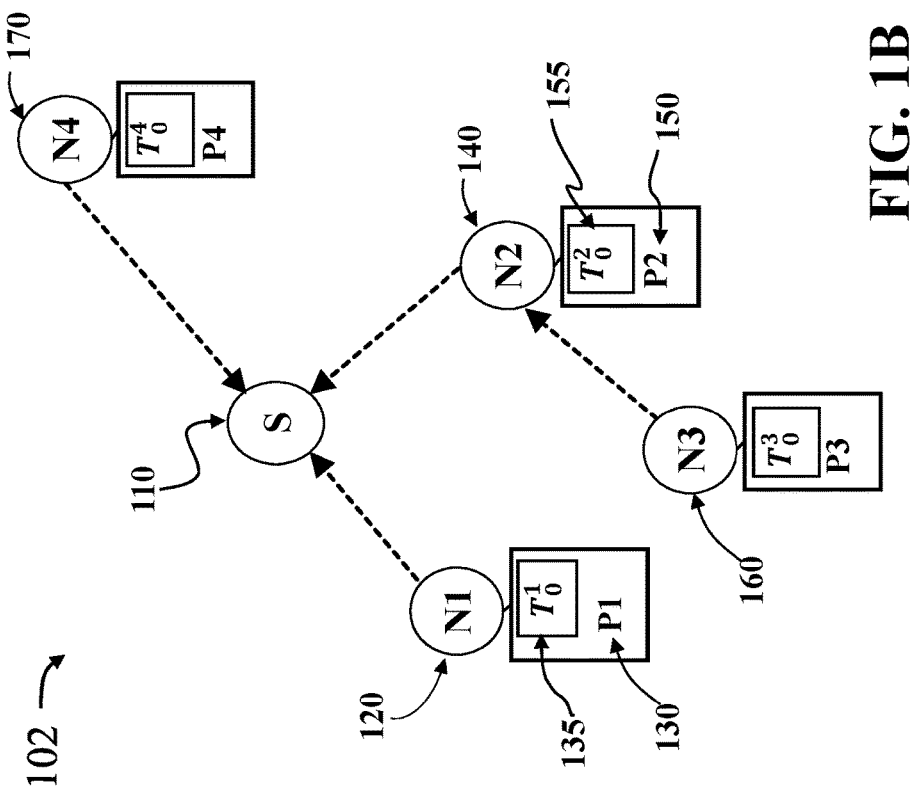
FIG. 1B is a schematic illustrating a convergecast network in an industrial setting, according to some embodiments of the present disclosure.

FIG. 1B is a schematic illustrating a convergecast network 102 in an industrial setting, according to some embodiments of the present disclosure. In particular, FIG. 1B shows an example of the network 102 in industrial setting, including a sink node S-110, and a set of wireless nodes, N1-120, N2-140, N3-160, N4-170. Each node is attached to a process, e.g., N1-120 is attached to process P1-130. Each process releases data at a given time, e.g., P1-120 releases data at time $T_0^1$-135. Note that release times could be different for each node, N1-120, N2-140, N3-160, N4-170. For instance, $T_0^1$-135 of node 120 could have a larger value than the time that process P2-150 releases data at $T_0^2$-155 of node 140. Specifically, we focus on the case when release times are not equal, which is termed as non-uniform release times.

Figure 1C:
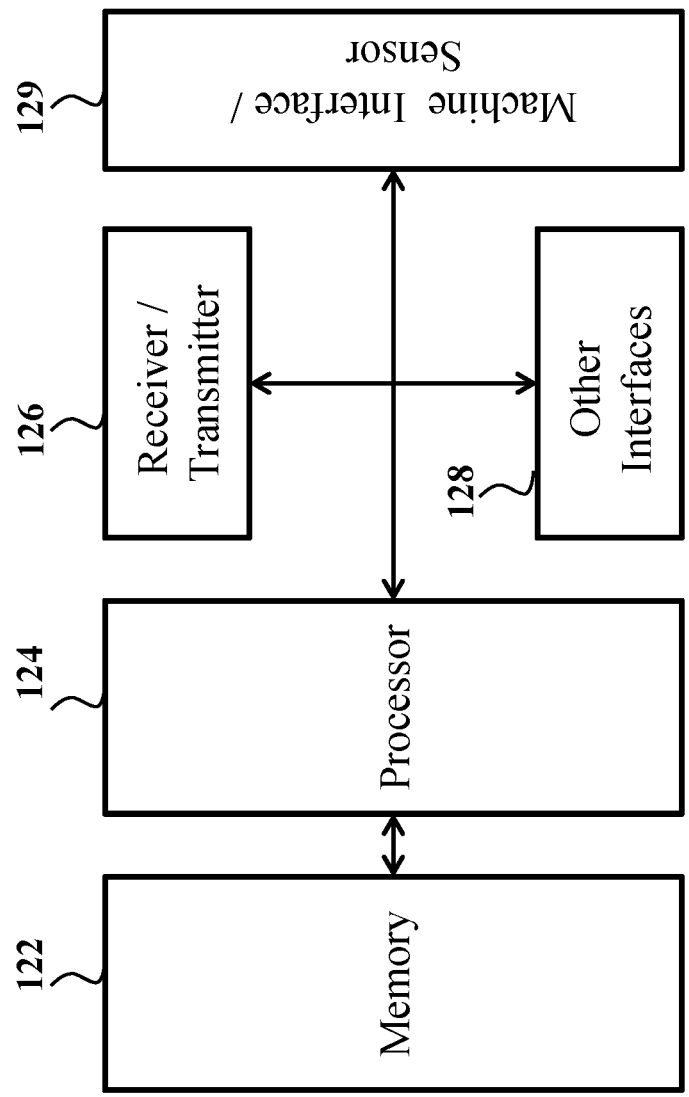
FIG. 1C is a block diagram illustrating function blocks of a node from the set of wireless nodes shown in FIG. 1B, according to some embodiments of the present disclosure.

FIG. 1C is a schematic illustrating a block diagram of functioning blocks of a node from the set of wireless nodes, N1-120, N2-140, N3-160, N4-170 shown in FIG. 1B, according to some embodiments of the present disclosure. For example, the node includes a memory 122, at least one processor 124, a receiver/transmitter 126, other interfaces 128 and at least one machine interface/sensor 129. In particular, we refer to an amount of memory dedicated in 122 for receiving or collecting data as the buffer.

Figure 2A:
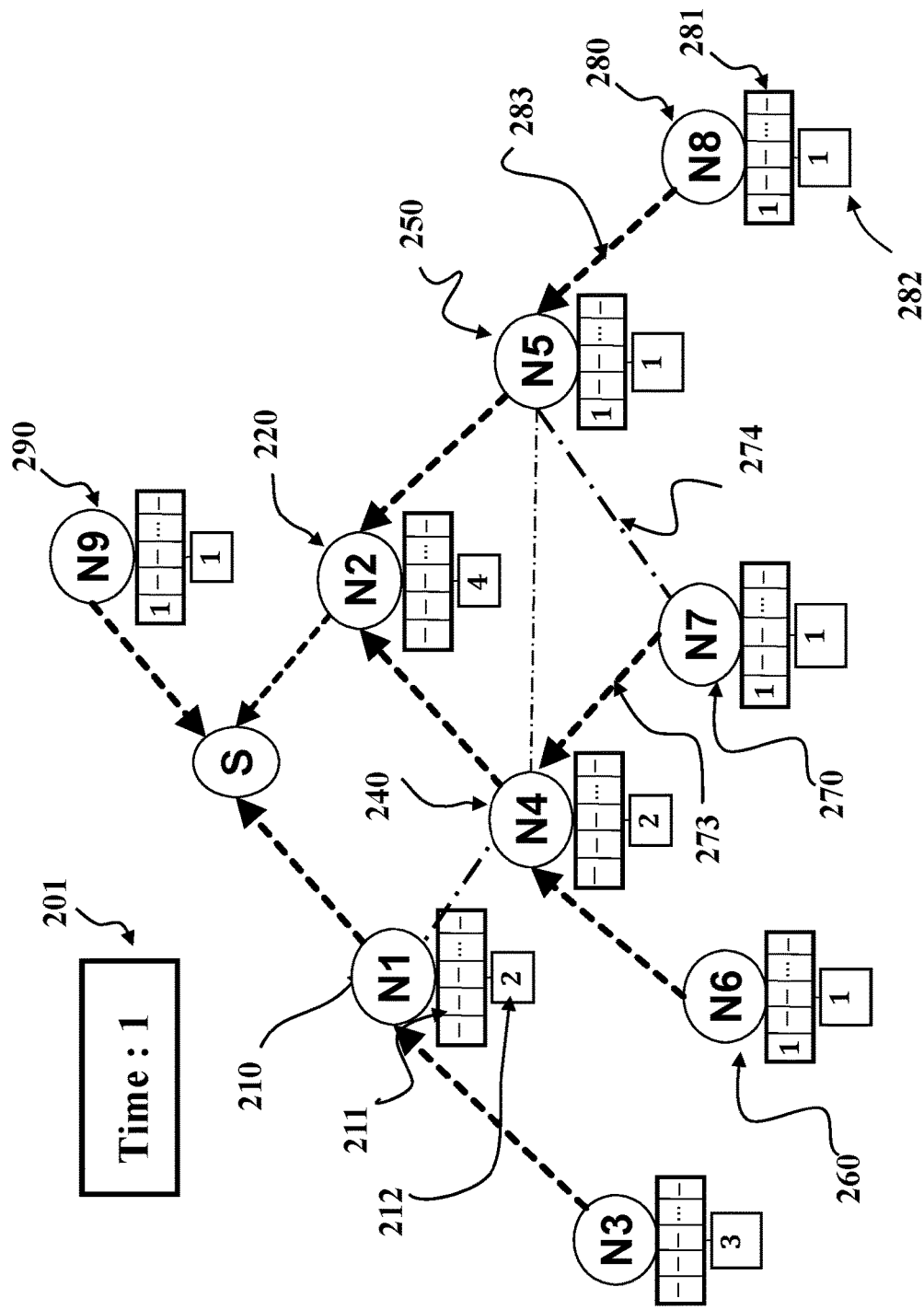
FIG. 2A is a schematic illustrating an example of network with nodes with different release times and illustration of local buffer, according to embodiments of the present disclosure.

FIG. 2A is an example of network with nodes with different release times and illustration of local buffer, according to embodiments of the present disclosure. In particular, FIG. 2A shows an example of a sensor network. Similar to FIG. 1B, nodes have different packet release times. In FIG. 2A, the processes in FIG. 1B or machine or sensors etc., have been suppressed like in FIG. 1B. The release time is attached to each node. For instance, N1 210 has release time shown in 212, $TT_0^1$=2. Similarly, N8 280, has release time in 282 with $T_0^8$=1. Capturing the state of the network at timeslot 1, 201, the state of the buffers is also attached to the nodes. For instance, FIG. 2A illustrates N8 with buffer 281, and N1 with buffer 211. In this example, N8 has one packet in the buffer, which is the data generated locally at time instance one. N1 has an empty buffer. In one implementation according to the present disclosure, the packets in the buffer are identified by their release times. Basic block diagram of functioning blocks of the node is shown in FIG. 1C. We refer to the amount of memory dedicated in 124 for receiving or collecting data as the buffer.

Furthermore, FIG. 2A shows routes, e.g., N8 transmits its data packet to N5 250 through wireless link 283. Since wireless communication is broadcast in nature, nodes could interfere with one another if they transmit on the same time frequency resource. In FIG. 2A, although the dedicated parent of node N7 270 is node N4 240, N8 interferes with N7 transmission through the wireless link represented by 274, unless the transmission on 273 happens on a different time-frequency block. Similarly, N5 interferes with N7. Thus, N5 and N7 can transmit simultaneously on two different frequency channels. However, note that since nodes can either transmit or receive in a given time slot, N5 cannot transmit if N5 is in receiving. Additionally, with simple signal processing techniques, two nodes that share the parent node cannot transmit simultaneously, even on different frequency channels. For instance, N7 and N6 cannot simultaneously transmit to N4 240.

Figure 2B:
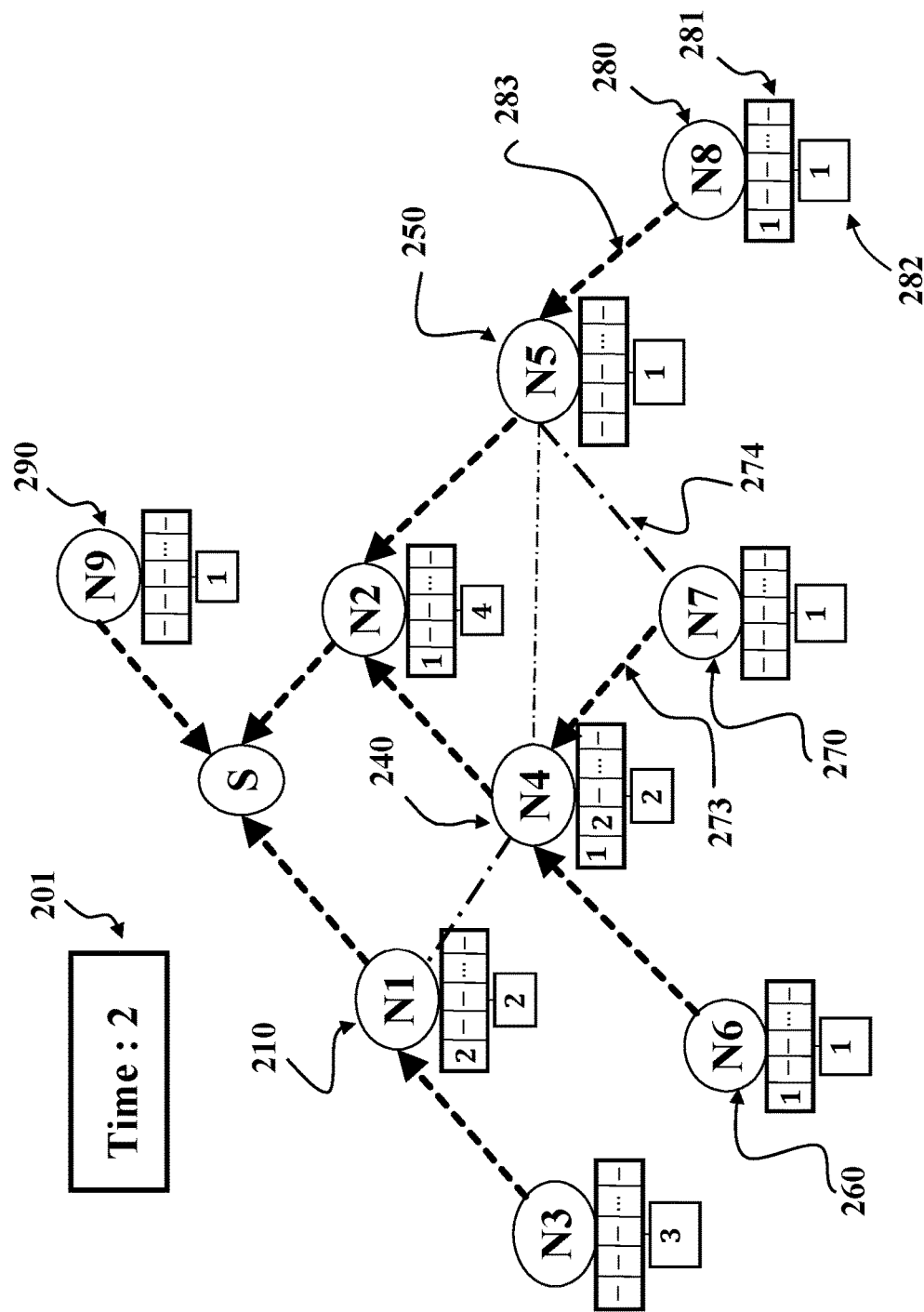
FIG. 2B is a schematic illustrating the network and buffer states at a future time instance of the network in FIG. 2A, according to embodiments of the present disclosure.

FIG. 2B is a schematic of network and buffer states at future time instance of the network in FIG. 2A, according to embodiments of the present disclosure. Given the constraints above, nodes N5 and N7 transmit one packet to their parents, N2 and N4, respectively. We further note the update in the status of the buffers. Additionally, we note that N8 was not able to transmit a packet since its parent node is in transmitting. Additionally, N6 was not able to transmit a packet, since its parent node N4 is busy in receiving a packet from node N7.

Figure 3:
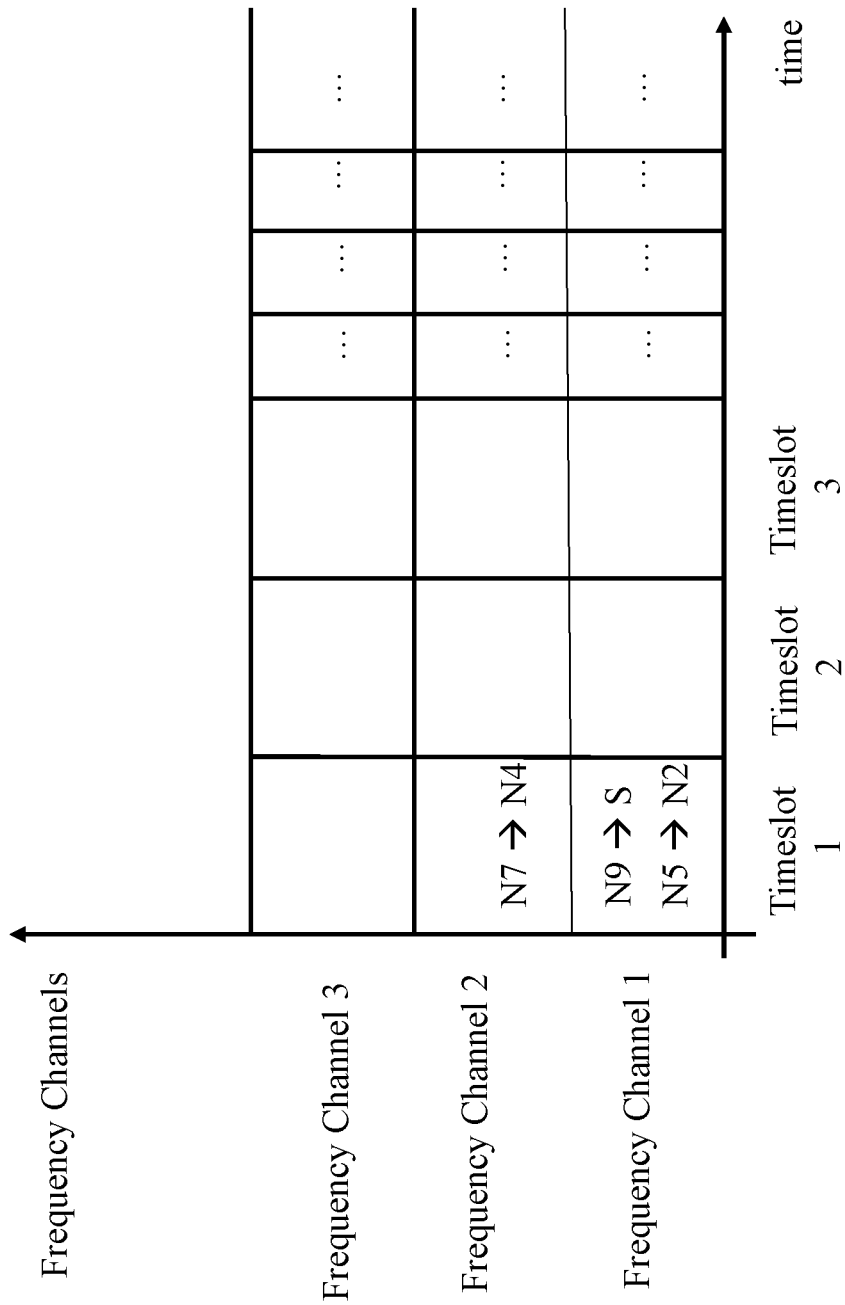
FIG. 3 is a table illustrating time frequency allocation to communication links, according to embodiments of the present disclosure.

FIG. 3 is a table illustrating time frequency allocation to communication links, according to embodiments of the present disclosure. In particular, FIG. 3 shows an example of the time frequency resources and the schedule for the first time slot. Further, FIG. 3 shows the availability of three frequency channels. In the following, we describe how to achieve the minimum schedule size and minimum end-to-end delay.

Small Schedule Size (Minimum Schedule Size)

In various embodiments of the present disclosure, we use sorting to identify the priority of the nodes. This has major impact on the schedule size. To demonstrate sorting metrics, we take three examples.

Sorting the nodes based on the total load refers to prioritizing the nodes with total number of packets need to be forward. In FIG. 2A, node N2 220 has to forward six packets, thus it has total load of six; node N1 210 has two packets as total load; node N4 240 has three; node N7 has one and node N5 has two.

Another sorting technique is based on the remaining load. For instance, in FIG. 2B, N7 has zero load after forwarding its packet; node N5 250 has one, while node N2 has five packets.

Another sorting technique prioritizes the child nodes of the sink node, since it is the bottleneck of the scheduler. Prioritizing the child nodes of the sink node, nodes N1, N2, and N9 have the highest priority. Thus, in case of the conflict of transmission between N1 and N4, N1 transmits first. Note that sorting the child nodes of the sink node can be done based on a specific metric and the non-child nodes of the sink node based on possibly different metric. This allows adjusting the complexity of the scheduler.

Furthermore, other sorting metrics can be used as well.

Low End-to-End Delay

To minimize the end-to-end delay without increasing the schedule size, various embodiments of the present disclosure allow the scheduling in the parent node. In such technique, a parent node, say k, may choose to schedule itself to transmit or receive based on some rules and conditions, such as the release time of the packet and the status of the buffer. This rule can be specified by the scheduling rule F.

Figure 4A:
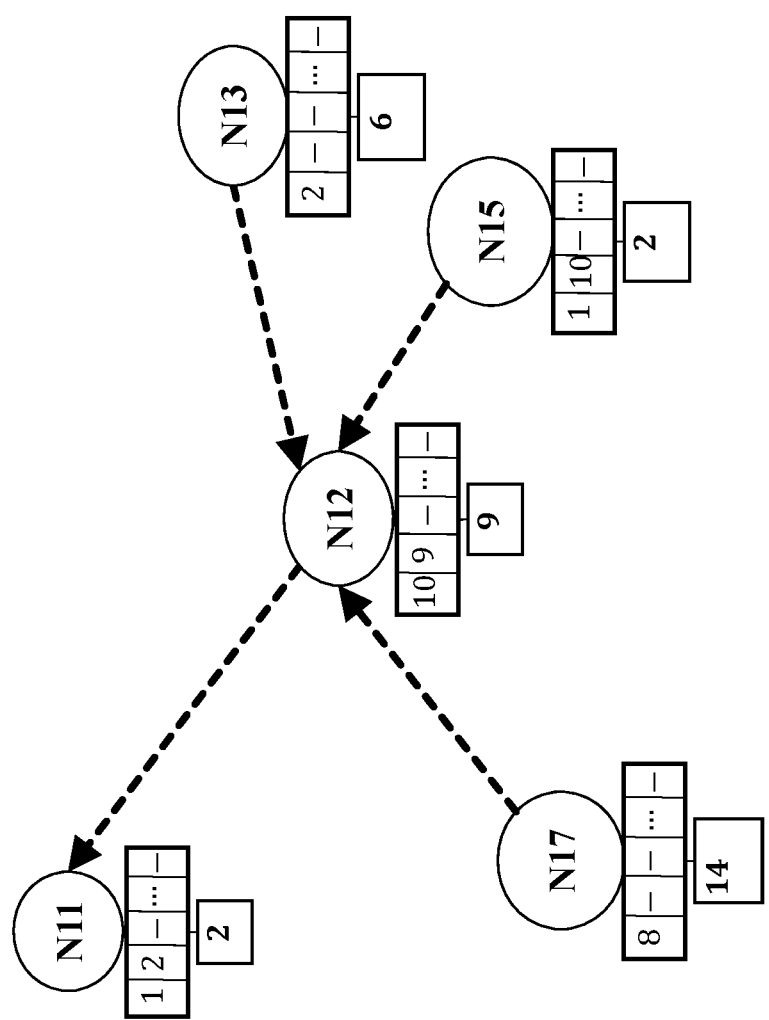
FIG. 4A is a schematic illustrating an example of group of nodes to demonstrate the scheduling rule of the child nodes, according to embodiments of the present disclosure.
Figure 4B:
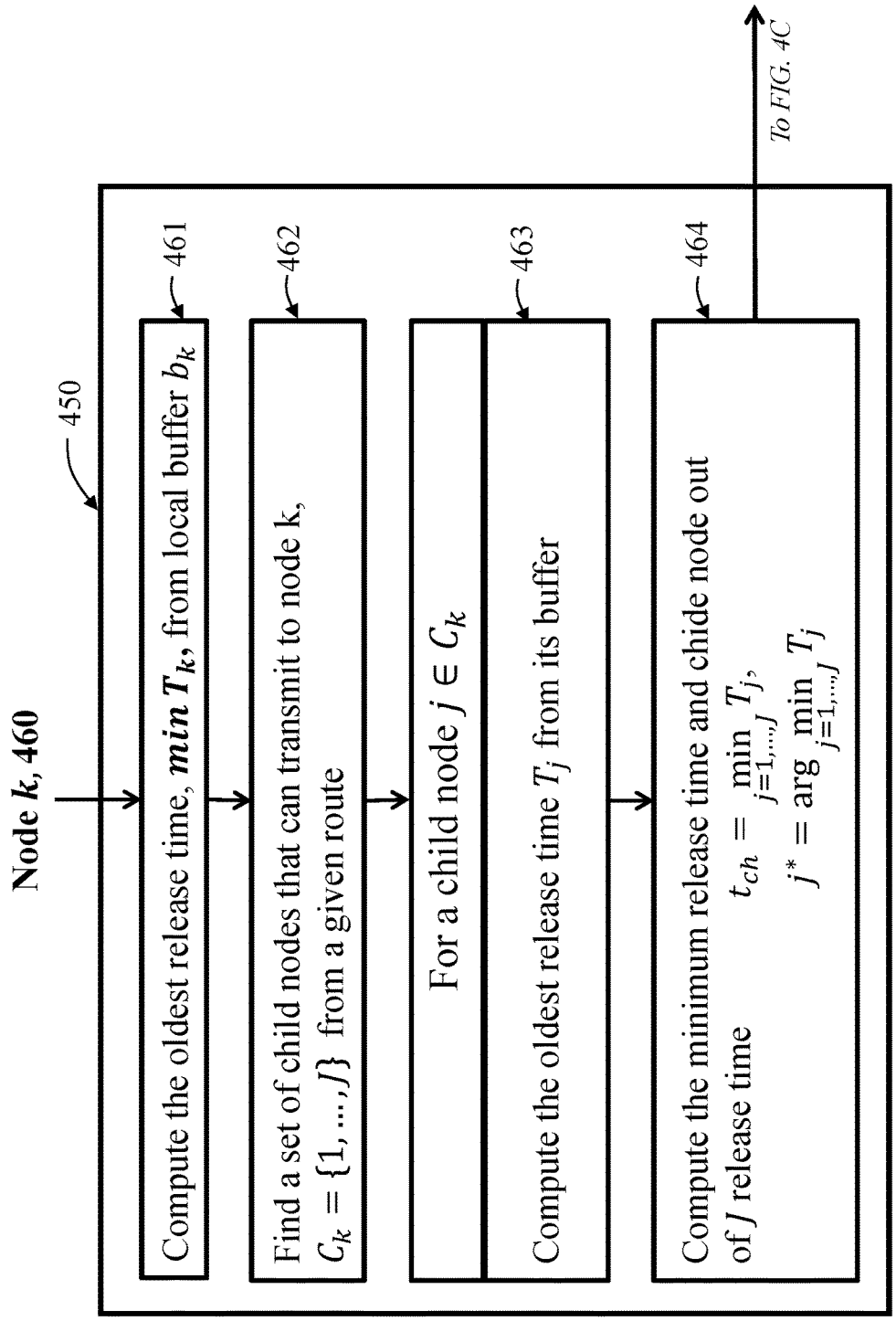
FIG. 4B and FIG. 4C are block diagrams illustrating function blocks of a demonstration of the scheduling threshold of the parent node, according to embodiments of the present disclosure.
Figure 4C:
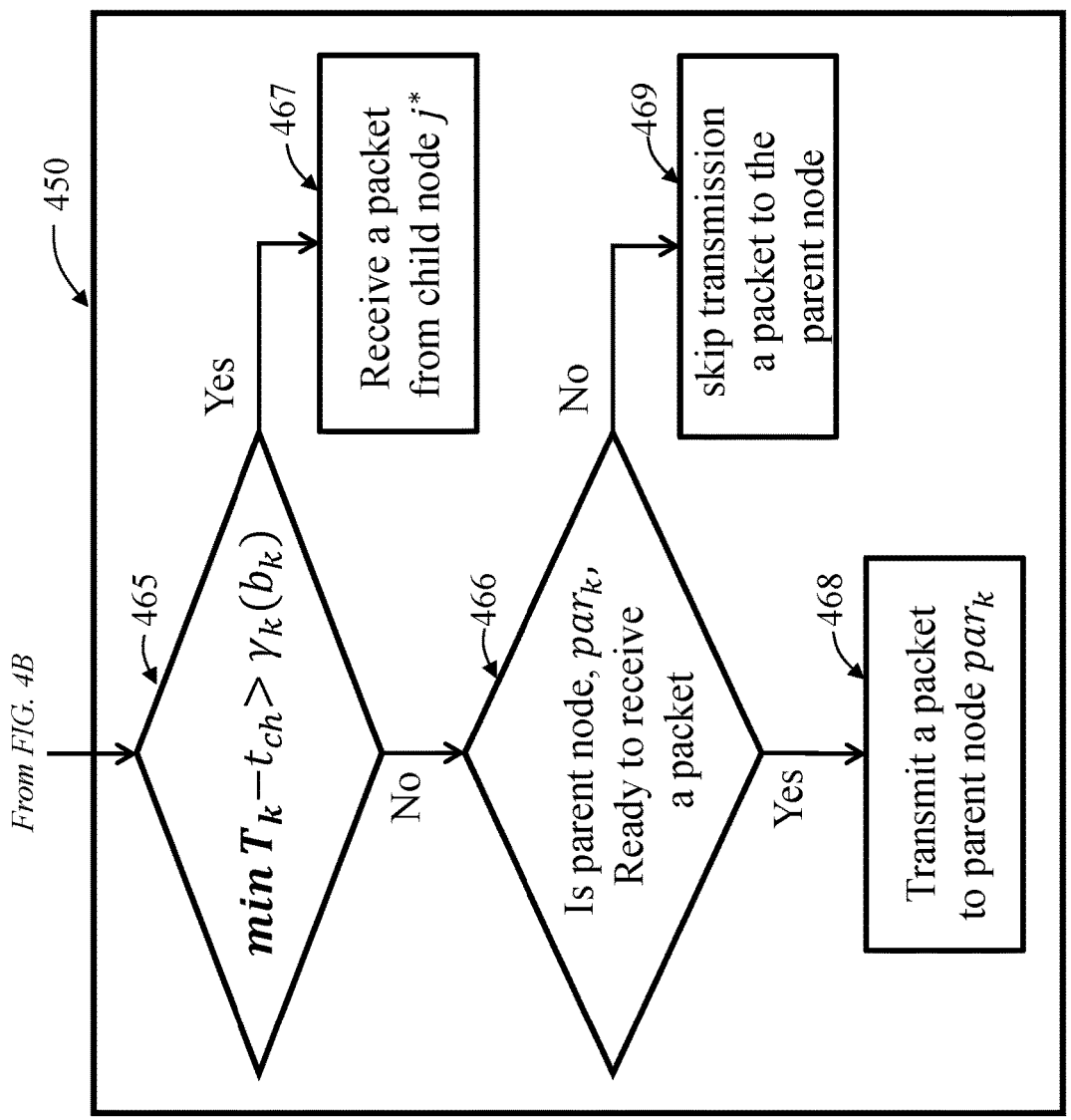

FIG. 4A, FIG. 4B and FIG. 4C are examples of the scheduling rule. For example, FIG. 4A is an example of group of nodes N11, N12, N13, N15, N17 to demonstrate the scheduling rule of the child nodes, according to embodiments of the present disclosure. FIG. 4B and FIG. 4C are a demonstration of the scheduling threshold of the parent node, according to embodiments of the present disclosure.

One implementation 450 in FIG. 4B, includes node k 460 and its associated child nodes 450. Among the child nodes of node k, node k chooses the child node, say child node j*, 467 in FIG. 4C, to transmit only if it has a packet that is older than a certain threshold $\gamma_k$, compared to the oldest packet in the local buffer of node k. The threshold could be a function of the status of the local buffer of node k, (number of packets in the local memory), status of parent node's ($par_k$) buffer, and status of child node's buffer.

As a case, parameters of scheduling rule F depend only on the load of the local buffer, $b_k$.

In 461 of FIG. 4B, node k computes the oldest release time, min $T_k$, from its local buffer $b_k$. From the routes, node k finds the set of child nodes $C_k$ 462. For the number of child nodes of the set $C_k$, say J, node k computes the oldest release time $T_1$ for a particular child node $j \in C_k$ 463. After the computation of the J oldest release times from J child nodes, node k computes the minimum oldest release time and its corresponding chide node as 464:

$$t_{ch} = \min_{j=1,\ldots,J} T_j,$$

$$j^* = \arg \min_{j=1,\ldots,J} T_j$$

so that $t_{ch}$ denotes the oldest packet release time stored in the child nodes' buffer. Also, j* denotes the index of the selected child nodes' node for scheduling. When the buffer is empty $T_j$ can be set to ∞.

The proposed scheduling rule F can be written as 465 of FIG. 4C:

$$F(b_k, t_{ch}) = \begin{cases} -1, & \min T_k - t_{ch} > \gamma_k(b_k) \\ +1, & \min T_k - t_{ch} \leq \gamma_k(b_k) \\ 0, & \text{otherwise} \end{cases} \quad (1)$$

In equation (1), −1 indicates receiving from a child node 467 of FIG. 4C, whereas +1 indicates transmitting from the local buffer 466 of FIG. 4C. In addition, 0 indicates skipping node k for scheduling.

Although the scheduling rule F decides to transmit, this transmission can be possible only when $par_k$ can receive a packet 468 of FIG. 4C and does not cause interference with previously scheduled links. Otherwise, node k defers its transmission 469 of FIG. 4C. Choosing $\gamma_k(b_k) = \infty$, the scheduler results always transmission from the local buffer when the load is equal to $b_k$. The choice of $\gamma_k(b_k)$ demonstrates a trade-off between the schedule size and end-to-end delay. For a small $b_k$, large values of $\gamma_k(b_k)$ will reduce the schedule size, while the opposite reduces the end-to-end delay.

Figure 5:
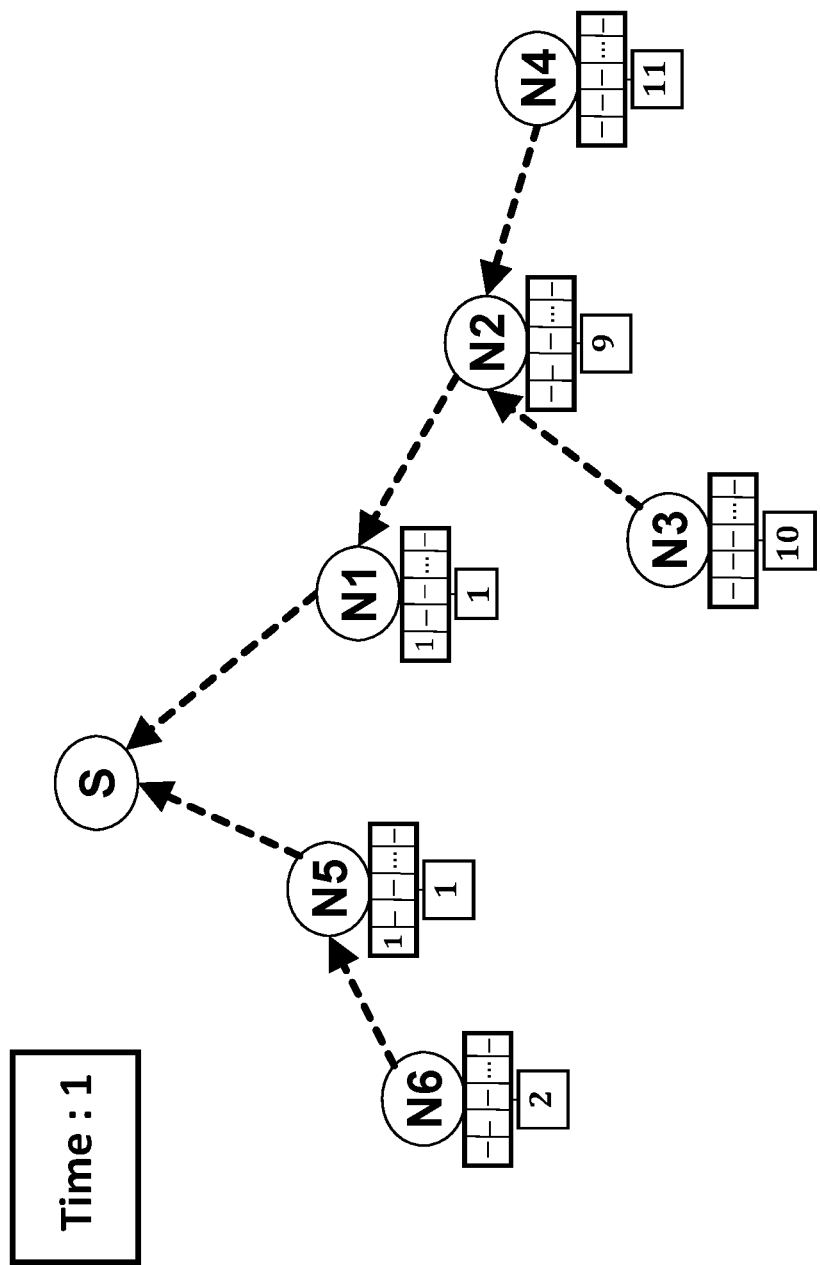
FIG. 5 is a schematic illustrating an example of group of nodes to demonstrate an example of the effective load calculation, according to embodiments of the present disclosure.

FIG. 5 shows an example of the effective load calculation, according to embodiments of the present disclosure which is disclosed in detail below. FIG. 5 includes nodes N1-N6 and a sink-node S. In particular, FIG. 5 provides a numerical example of effective load calculation at time slot one for child nodes N2, N3, N4, N6 of the sink node S. In this example, we see that N1 has a packet in its buffer and the next arriving packet is at time nine from N2. On the other hand, N5 has a packet in its buffer and the next arriving packet is at time two from N6. Thus, the effective load of N1 is one, while the effective load of N5 is two. This is discussed in more detail below.

Referring to FIG. 4A, FIG. 4A demonstrates an example to this rule, where we assume that node N12 is permitted to transmit or receive, and $\gamma_{12}(b_{12}) = \infty$. Thus, N12 picks, typically, the oldest packet. In this example, it is the packet with release time nine. This is because local buffer has two packets released at nine and ten. Since a packet released at nine is older than other packets, the packet released at time nine is pick for scheduling.

As an illustration, we can have $$\min_{j \in C_{N12}} \min T_i = 1$$

and min $T_{N12} = 9$. Then, the difference by equation (1) is 9−1=8. Thus, if we choose $\gamma_{12}(2) = 10$, then min $T_{N12} - t_{ch} \leq \gamma_{N12}(b_{N12})$. However, if we choose $\gamma_{12}(2) = 5$, then the min $T_{N12} - t_{ch} > \gamma_{N12}(b_{N12})$, so that N12 receives a packet from N15.

One problem that could arise from this scheduling rule is the repetitive reception of packets, i.e., when node k chooses to receive packets from the child nodes, $C_k$, over number of consecutive timeslots, while $par_k$ and (possibly its parents) have empty buffers. This accumulation of packets in node k may increase the schedule size by missing transmission opportunities to the sink. To demonstrate this, FIG. 6A, FIG. 6B and FIG. 6C show an example.

Figure 6A:
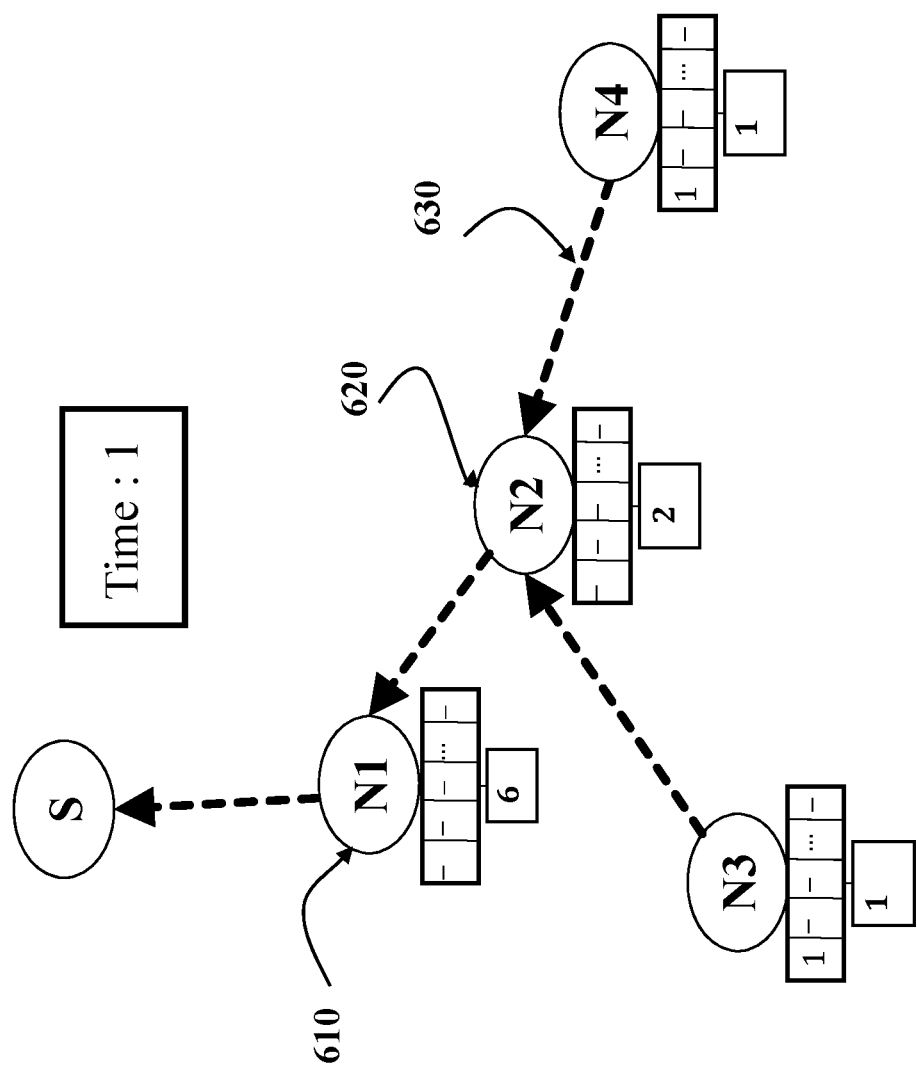
FIG. 6A, FIG. 6B and FIG. 6C are schematics illustrating an example of network with nodes with different release times and an example of a packet accumulation problem, according to embodiments of the present disclosure.
Figure 6B:
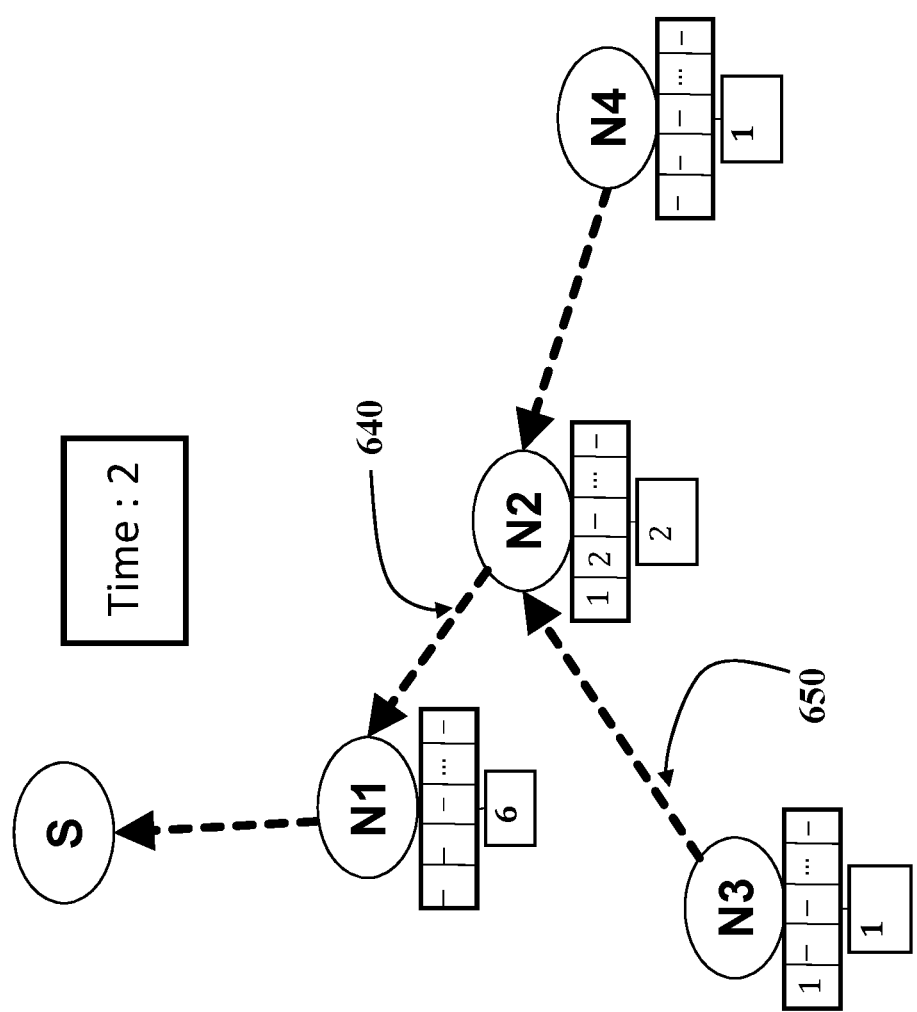
Figure 6C:
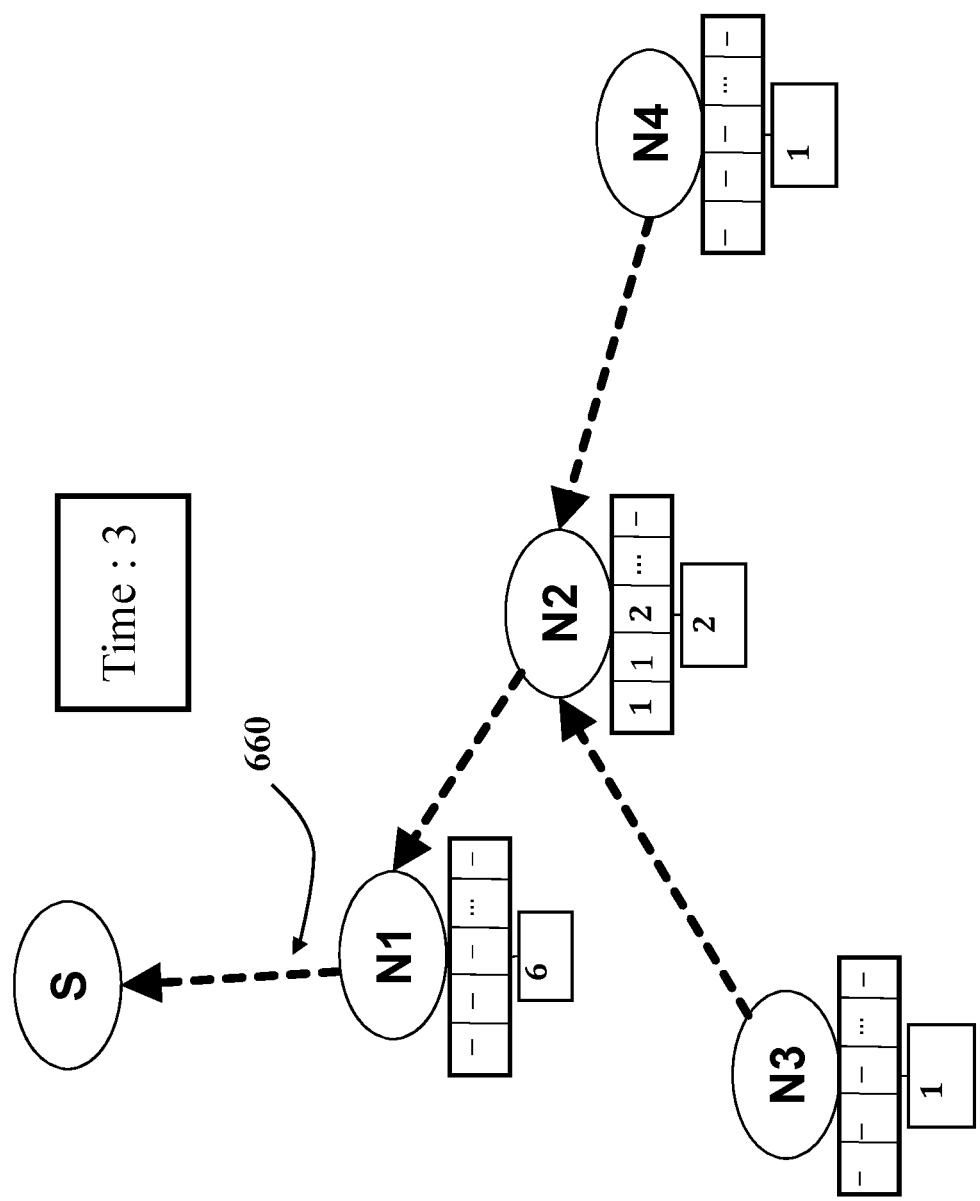

FIG. 6A, FIG. 6B and FIG. 6C are an example of a packet accumulation problem, according to embodiments of the present disclosure. For example, let the nodes in FIG. 6A, FIG. 6B and FIG. 6C have the following priority {N2, N1, N3, N4}, determined by the number of the conflicting links or number of neighbors. Furthermore, we assume that the buffer size is large for all the nodes N1-N4, so that we do not expect an overflow of a buffer for the current load, and $\gamma_i=0$, for all i ∈ {N1, N2, N3, N4}. As we discussed above, in order to reduce the schedule size, the sink should be kept busy. However, due to a particular sorting in this example, node N2-620 of FIG. 6A has higher priority than the node close to the sink, node N1-610 of FIG. 6A. Thus, node using the scheduling of the parent node considering the local and child buffers will increase the schedule size. As shown in the FIG. 6B, at time instant two, node N2 uses link 650 instead of using link 640, despite the fact that N1 has empty buffer. In the FIG. 6C, link 660 can be used in time instant three. This increases the schedule size by one timeslot.

Figure 7:
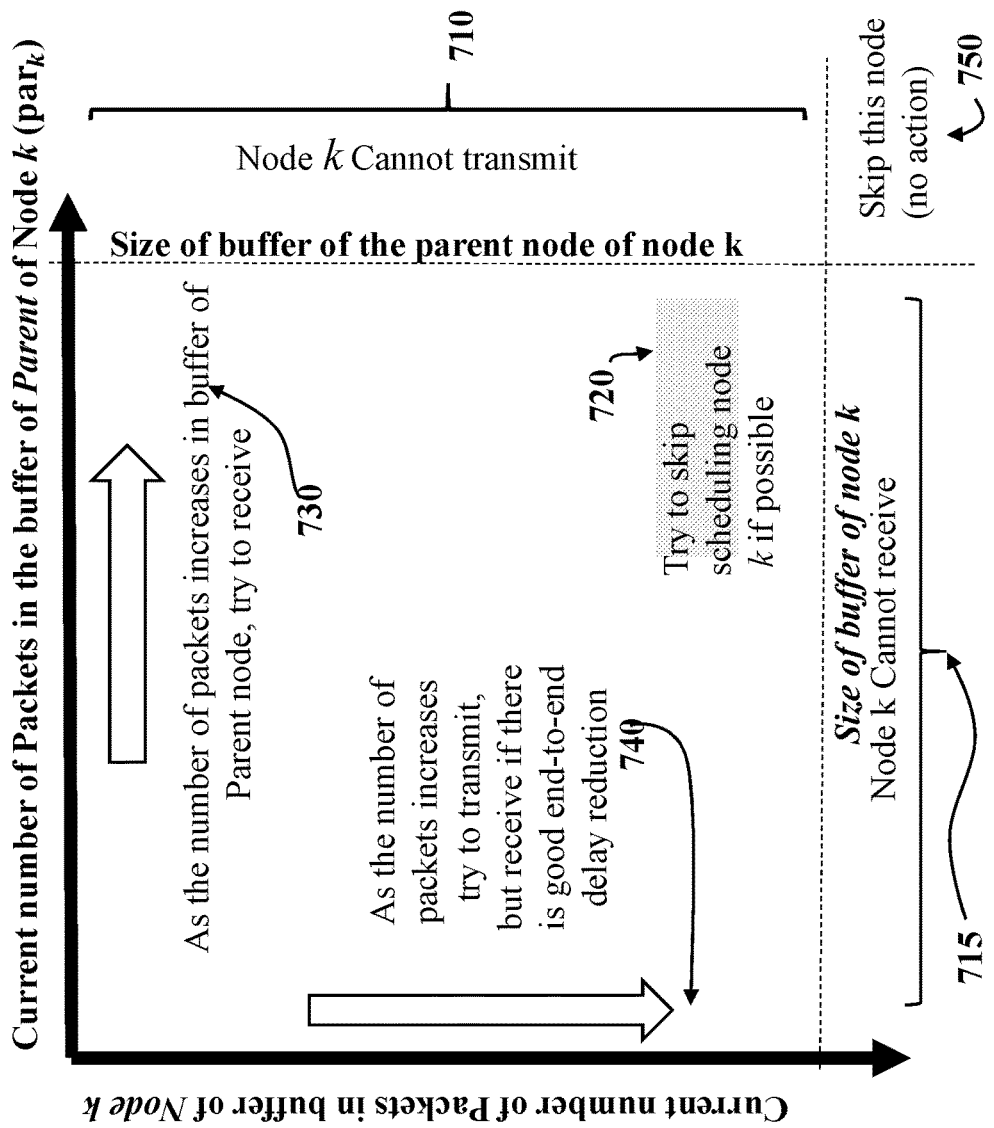
FIG. 7 is a schematic describing transmit or receive regimes when the buffer status of the parent node is also used, according to embodiments of the present disclosure.

FIG. 7 is a schematic describing transmit or receive regimes when the scheduling of the parent node is used, according to embodiments of the present disclosure. For example, FIG. 7 includes the buffer status of the parent node, $par_k$, so we can alleviate this problem. In particular, FIG. 7 shows the desirable behavior of such a scheduling rule. Wherein this is a special case of a more general rule where the status of the parent's buffer, $b_{par_k}$, is considered as well (note, the sink node makes the schedule).

Still referring to FIG. 7, node k cannot receive or transmit in the regions where the local buffer is full 715 or parent node's buffer is full 710. If the local and parent node's buffers are full, 750, then node k should be skipped for scheduling. The reception of packets should be encouraged over transmission if the buffer of $par_k$ has large number of packets, 730, while transmission from the local buffer should be encouraged if the local buffer has large number of packets, 740. In general, when both buffers of node k and $par_k$ have large number of packets, it indicates a possible congestion and an increased delay in the path to the sink node, so that skipping node k for scheduling could be preferable.

In one implementation of the present disclosure, one of the possible functions of the threshold $\gamma_k(b_k, b_{par_k})$ that has most of the desirable properties described above is as follows:

$$\gamma_k(b_k, b_{par_k}) = \begin{cases} 0, & b_k = 0 \text{ and } b_{par_k} \leq b_{max} \\ f(b_k, b_{par_k}), & b_k, (b_{par_k} + 1) \in \{1, \ldots b_{max} - 1\} \\ \infty, & b_k = b_{max} \text{ and } b_{par_k} < b_{max} \\ N/A, & \text{otherwise} \end{cases} \quad (2)$$

where $$f(b_k, b_{par_k}) = \text{ceil}\left(\frac{\exp(\alpha \, b_k)}{\beta(b_{par_k} + 1)}\right) \quad (3)$$

where $b_{max}$ is the maximum buffer size, $\alpha$ and $\beta$ are design parameters. Also, ceil(.) denotes the ceiling function. Note that the state of the parent node's buffer is one of the key parameters of function $f(b_k, b_{par_k})$. In the FIG. 4A, for $par_{N12}$=N11, we take $\alpha$=0.5, $\beta$=0.25, and $b_{max}$=3, then the result for equation (2) is shown in Table 1.

TABLE 1

The value of $\gamma_k$ ($b_k$, $b_{par_k}$) based on equation (2) and equation (3):

| $b_k$ | $b_{par_k}$ | | | |
|---|---|---|---|---|
| | 0 | 1 | 2 | 3 |
| 0 | 0 | 0 | 0 | 0 |
| 1 | 7 | 4 | 3 | 2 |
| 2 | 11 | 6 | 4 | 3 |
| 3 | ∞ | ∞ | ∞ | N/A |

Note the variation of values of $\gamma_k$ ($b_k$, $b_{par_k}$) as a function of $b_k$ and $b_{par_k}$, so does the scheduling rule F ($b_k$, $b_{par_k}$, $t_{ch}$).

Referring to FIG. 4A to FIG. 4C, provides an illustration with $b_{max}$=3 packets, node N12 is discouraged from transmitting since the number of packets in the buffer of N11 increases. On the other hand, N12 is encouraged to transmit when its local load is large and its parent node has small number of packets in its buffer since $\gamma_k$ ($b_k$, $b_{par_k}$) keeps increasing. According to the table, and obtained $\gamma_{N12}(b_{N12}, b_{N11})$=6, we see that N12 is scheduled to receive a packet from N15.

Finally, note the instant function in equation (3) is more suitable for packet networks with a small number of packets, and with an exponential increasing as a function of the local buffer. Other functions with a slower increase (linear for example) can be used as well.

Effective Load

The definition of load in non-uniform release time has impact on the priority of nodes and thus the scheduling of the nodes. The release time could be relatively large at some nodes, so that prioritizing the nodes based on such load could be misleading. Thus, in one embodiment of the present disclosure, we consider the effective load, which is defined as the maximum number of packets passed through a node within a given time window W, where W=[$t_1$, $t_2$], $t_1 \leq t_2$. Note that if we define W=[0, ∞), then the effective load becomes a total load. Also, with another window, W=[t, ∞), the effective load becomes the remaining load at time t.

In general, the choice of $t_1$ and $t_2$ impacts the scheduling decisions and complexity. For instance, using the remaining load to resort all the nodes could be complicated if the number of nodes is large. In addition, in the non-uniform release time environment, the choice of $t_2$ is important.

Referring to FIG. 5, one example is to make $t_2$ increase gradually until the nodes have different loads or reach the maximum release time. FIG. 5 provides a numerical example of effective load calculation at time slot one for child nodes of the sink node. In this example, we see that N1 has a packet in its buffer and the next arriving packet is at time nine from N2. On the other hands, N5 has a packet in its buffer and the next arriving packet is at time two from N6. Thus, the effective load of N1 is one, while the effective load of N5 is two.

Scheduling Scheme

For many delay sensitive applications, the central controller could be used to reduce the delay. As noted above, the sink node can act as the central controller, so that it controls each node when it receives the data packet from its associated child node or transmits the data packet to its associated parent node.

In the following, we provide a centralized scheme that minimizes the schedule size and end-to-end delay. However, it is also possible to design a distributed scheme based on one or more embodiments of the present disclosure.

We first define new data sets that we use in the scheme below. Let $I_k$ be the set of interfering nodes with node k. $I_k$ depends on the topology of the network and whether acknowledgement is implemented in the system. Further, let S be a M×(N+1) matrix that represents the scheduling of the network, where N is the total number of the sensor nodes in the network and M is the expected size of the schedule. S(t, k) takes values $\{0, \pm 1, \pm 2, \ldots, \pm L\}$, where L is the number of frequency channels, the sign of S(t, k) represents whether node k is set to transmit or receive at timeslot t over channel ch $\in \{1, \ldots, L\}$. Also, +ve indicates transmission, whereas −ve indicates receiving. Otherwise, it is in idle mode.

In other words, as noted above, the scheduling matrix represents the scheduling of the network:

$$S \in \{-L, -L+1, \ldots, L-1, L\}^{M \times (N+1)},$$

wherein (L) is a number of frequency channels, (M) is a schedule size, (N) is a number of nodes, (+) is transmits and (−) is receives. Further, the child nodes of the sink-node have a higher priority over other nodes of the plurality of nodes regarding transmitting or receiving. Such that each child node of the sink-node is sorted by a remaining load and each other node of the other nodes is sorted by a total load. Wherein the total load includes a number of packets to be transmitted by each node, a number of packets to be forwarded by each node, or both, in a period of time, along with including any previous transmitted packets by each node, any previous forwarded packets by each node, or both, in a period of time. Wherein the remaining load is a number of packets each node transmits, forwards, or both, in a remaining of the period of time.

Let Q represent a sorted list of nodes as described above. In this scheme, we use sorting that the child nodes of the sink node have higher priority. In other words, we split Q as Q={Q', Q"}, where Q' is the sorted child nodes of the sink node, i.e., Q' includes all the nodes in $C_{sink}$. On the other hand, Q" is the list of sorted nodes that are not the child nodes of the sink node, i.e., $C_i \, \forall i \in \{1, \ldots, N\}$.

Centralized Scheduling Scheme

Figure 8A:
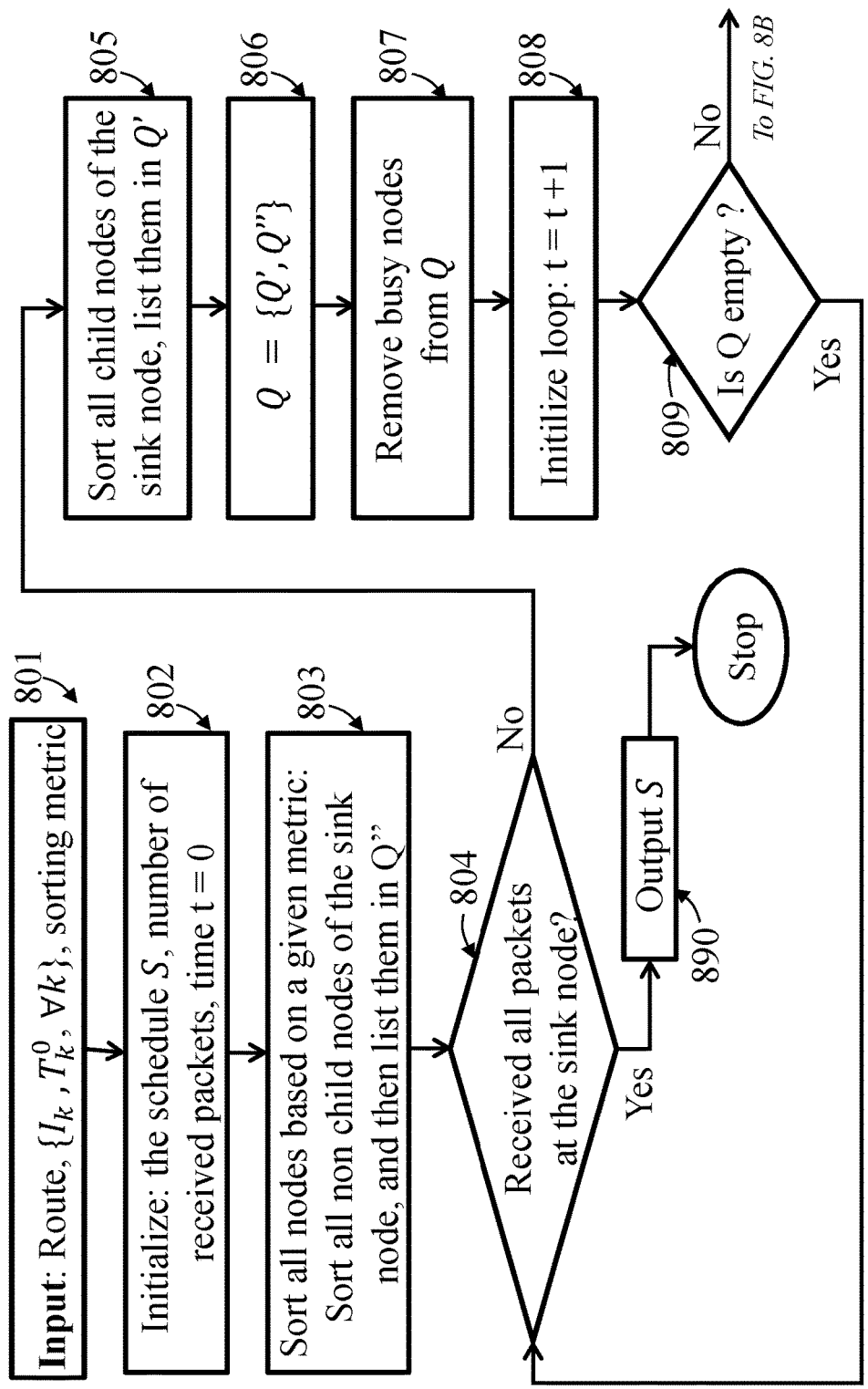
FIG. 8A and FIG. 8B are block diagrams illustrating function blocks describing a centralized implementation of the scheduling scheme, according to embodiments of the present disclosure.
Figure 8B:
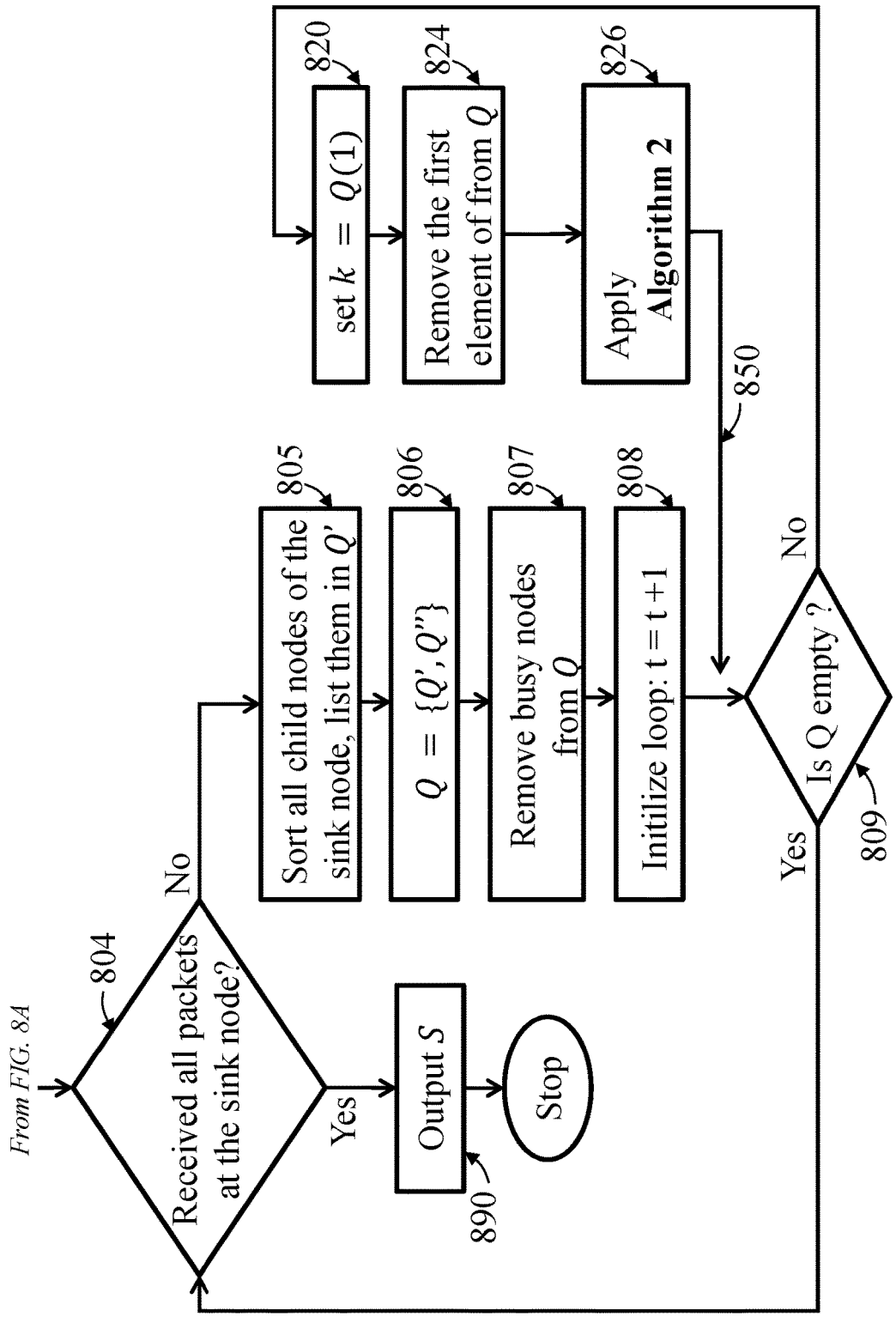

FIG. 8A and FIG. 8B show a centralized implementation of the present disclosure. In Algorithm 1 of FIG. 8A, we assume that the input of the algorithm, at 801, includes the convergecast route, the release times for all the packets $\{T_k^0\}$, the interference relations $\{I_k\}$, sorting metric of interest. In this implementation of the scheme, we use the total load for the nodes that are not child nodes of the sink node and the remaining load for the child nodes of the sink node. This is advantageous as we shall describe later.

Still referring to FIG. 8A, next in the algorithm, 802, initializes the schedule S as an all zeros M×(N+1) matrix. Also it initializes timeslot t to zero. Next, we perform an initial sorting for all the nodes. In this implementation, we prioritize the child nodes of the sink node. The sorted non-child nodes of the sink node are listed in Q" 803. The algorithm proceeds until all the packets are received 804. Then, the output of algorithm is the schedule S, 890.

Still referring to FIG. 8A, in each iteration, at each time slot, the algorithm sorts the child nodes of the sink node based on the remaining load, Q' in 805. Using this implementation, in each iteration, resorting is done for the child nodes of the sink node only, which has a small complexity compared to sorting all the nodes, Q={Q', Q"} 806. The two sets are stored in set Q. In this iteration, all busy nodes, i.e., nodes that have S(t, i)≠0, are removed from Q, 807. Next, in 808, the iteration is initialized by incrementing the time indicator t.

Referring to FIG. 8A and FIG. 8B, if the set Q is not empty, 809, we traverse over Q. In each iteration, k is set to be the first node in Q 820, then we take out the first element of Q 824. For node k, we apply Algorithm 2, at 826 to decide whether node k has to transmit or receive. After Algorithm 2, 850, we test whether Q is empty at 809. When Q is empty, the iteration over this time slot is concluded, then we have to check whether we have received all the packets, and then proceed to 804 or 890.

Figure 9A:
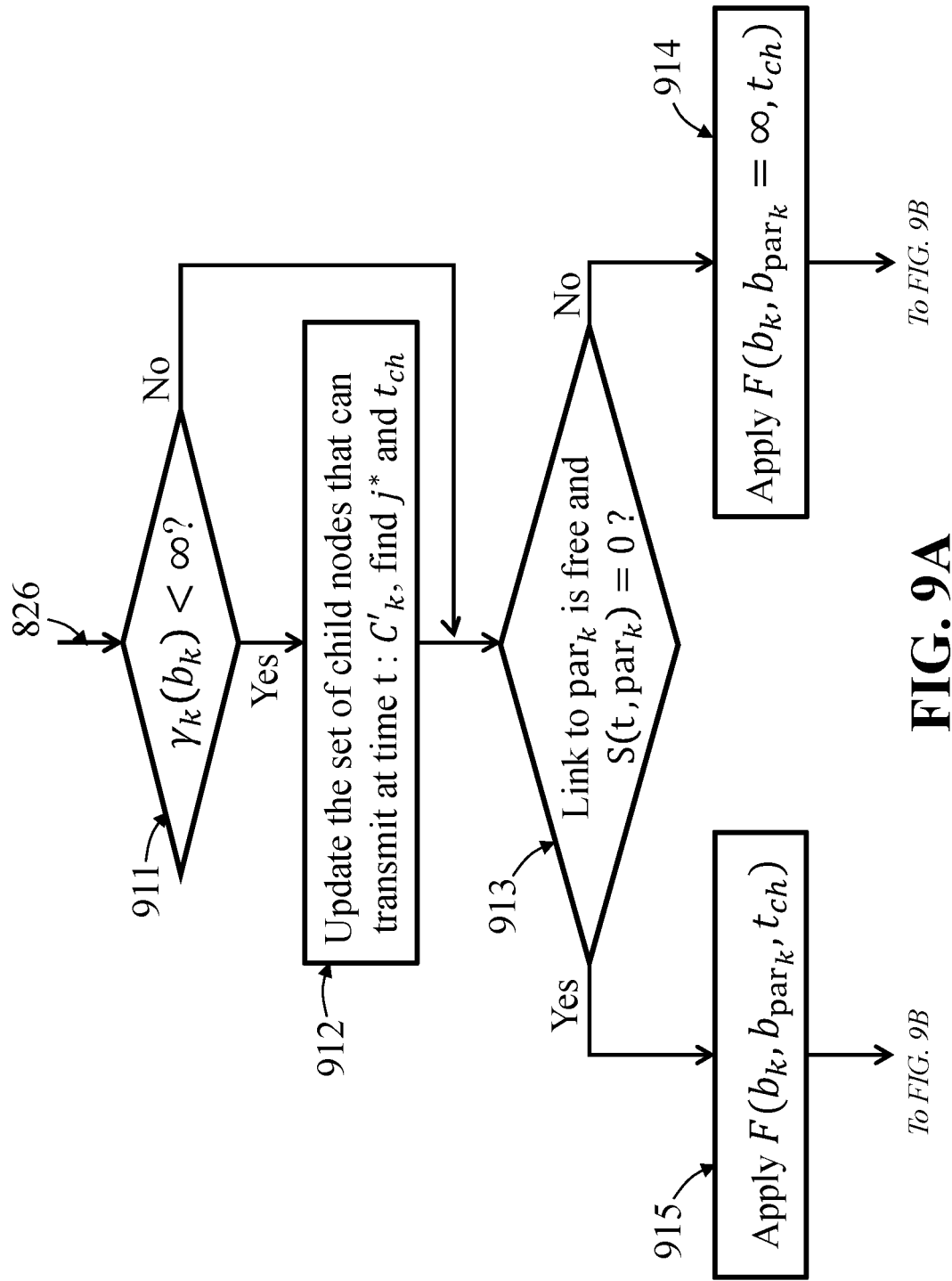
FIG. 9A and FIG. 9B are block diagrams illustrating function blocks describing the scheduling of the nodes with the buffer, according to embodiments of the present disclosure.
Figure 9B:
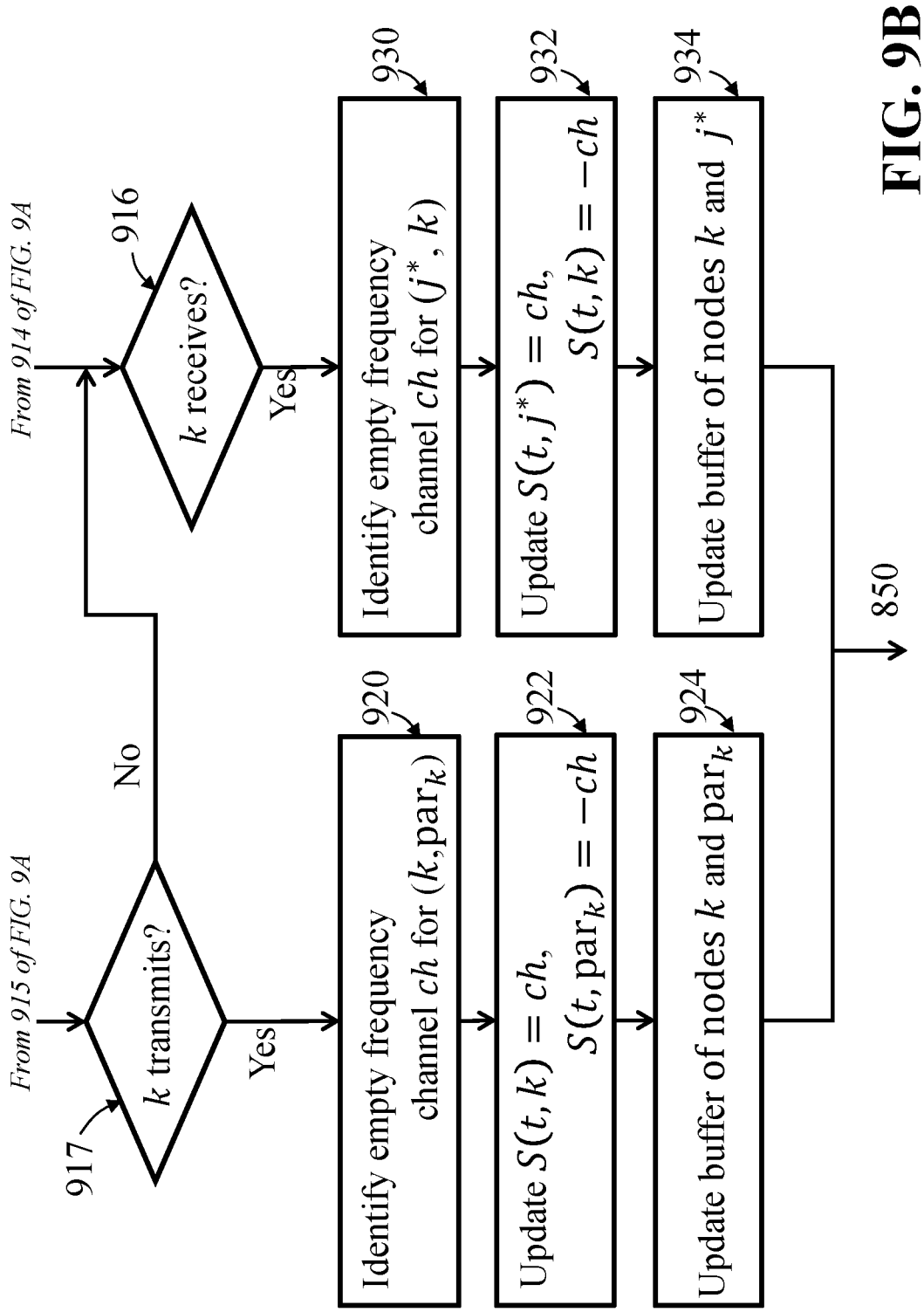

FIG. 9A and FIG. 9B are block diagrams illustrating function blocks describing the scheduling of node k considering its buffer status, associated parent node's buffer status, and associated child nodes' buffer status, according to embodiments of the present disclosure. Specifically, in FIG. 9A and FIG. 9B, we show an implementation of Algorithm 2.

Referring to FIG. 9A, starting at 911, after 826, we test whether node k is permitted to receive with the current buffer size $b_k$. This can be done by checking if $\gamma_k(b_k) < \infty$. Next, we identify, i.e. update, 912 the set of feasible child nodes $C'_k \subset C_k$, where $C'_k$ are the subset of child nodes of node k that are not busy and can transmit to node k at timeslot t, as in 462 of FIG. 4B. Note that a node $j \in C_k$ can transmit to node k if neither of node k or node j are busy and there is a channel ch∈{1, . . . , L}, such that assigning ch to (j,k) at time t does not cause interference to any other links in the network.

Similarly, at 913 we verify whether node k may transmit over (k, $par_k$) and whether $par_k$ is busy. If either of these conditions are not satisfied, i.e., 913 is negative, then node k cannot transmit to the $par_k$. In 914, we need to apply the scheduling rule F ($b_k$, ∞) using the threshold $\gamma_k$ ($b_k$, ∞) and test if node k can receive.

Referring to FIG. 9B, based on the particular case, the algorithm updates the schedule S and the buffer states of the related nodes and using one of the available channels, ch, as shown in 916 and 917. After the procedures of Algorithm 2 are concluded at 850, we continue with remaining of Algorithm 1 as indicated above at 850 and 809.

When node k is scheduled to transmit, it identifies empty channel to its parent node $par_k$ 920 for transmissions. Then update the scheduling matrix 922, that is, node k transmits packets to node $par_k$ via channel ch at time slot t (S(t, k)=ch) working in pairs $par_k$ receives packets from node k via channel ch at time slot (S(t,$par_k$)=-ch). In 924, update buffers of node k and its associated buffer of node $par_k$ due to respectively transmitting and receiving. When node k is scheduled to receive, it identifies empty channel to its selected child node j* 930 for receiving. Then update the scheduling matrix 932, that is, node k receives packets from node j* via channel ch at time slot t (S(t, k)=-ch) working in pairs j* transmits packets to node k via channel ch at time slot t (S(t, j*)=ch). In 924, update buffers of node k and its associated buffer of node j* due to respectively receiving and transmitting.

Figure 10:
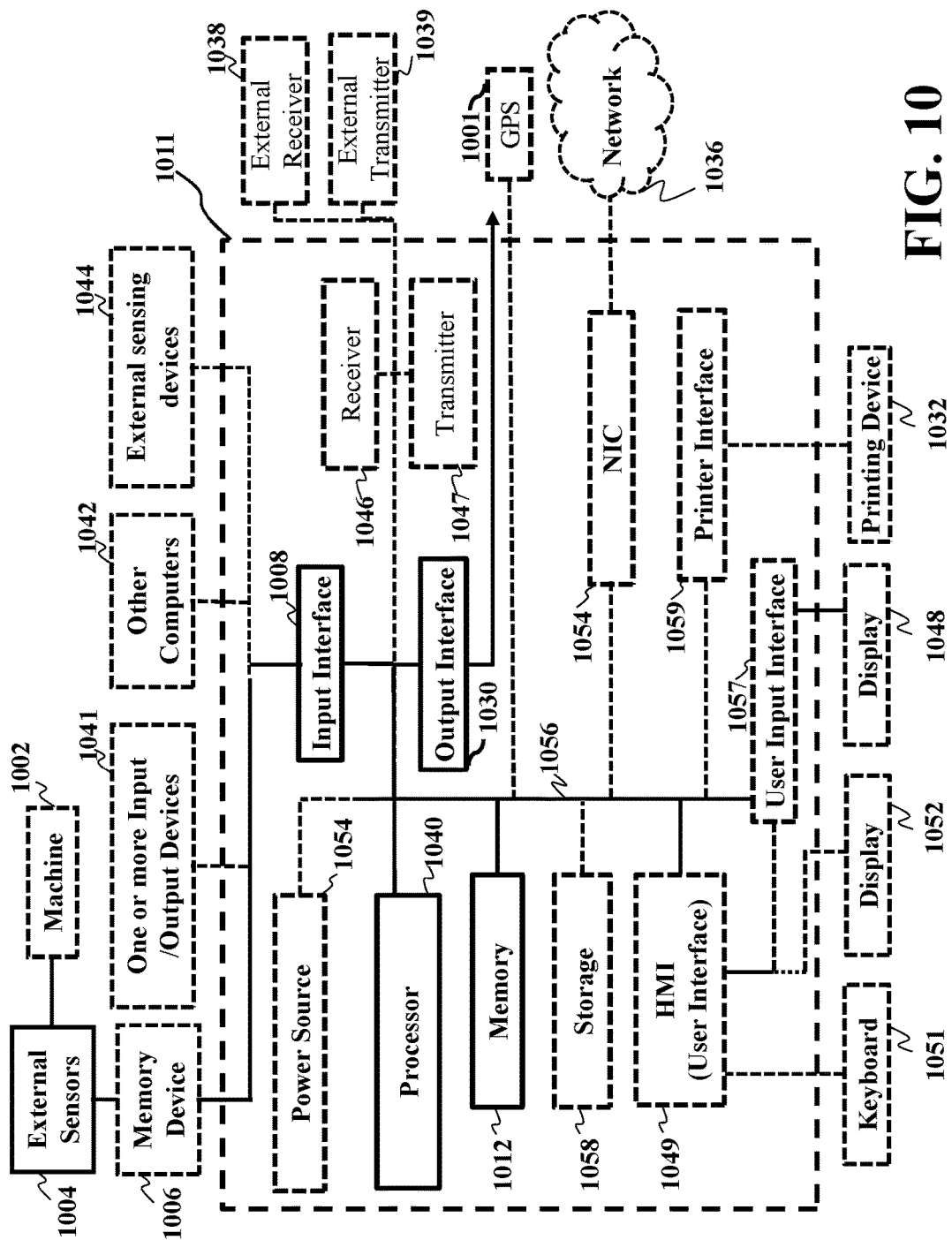
FIG. 10 is a block diagram of illustrating the method of FIG. 1A, that can be implemented using an alternate computer or processor, according to embodiments of the present disclosure.

FIG. 10 is a block diagram of illustrating the method of FIG. 1A, FIG. 1B and FIG. 1C that can be implemented using an alternate node, according to embodiments of the present disclosure. Each node of the plurality of nodes along with the sink-node 1011 may include, a processor 1040, computer readable memory 1012, storage 1058 and user interface 1049 with display 1052 and keyboard 1051, which are connected through bus 1056. For example, the user interface 1049 in communication with the processor 1040 and the computer readable memory 1012, acquires and stores the data in the computer readable memory 1012 upon receiving an input from a surface, keyboard surface, of the user interface 1057 by a user.

Contemplated is that the memory 1012 can store instructions that are executable by the processor, historical data, and any data to that can be utilized by the methods and systems of the present disclosure. The processor 1040 can be a single core processor, a multi-core processor, a computing cluster, or any number of other configurations. The processor 1040 can be connected through a bus 1056 to one or more input and output devices. The memory 1012 can include random access memory (RAM), read only memory (ROM), flash memory, or any other suitable memory systems.

Still referring to FIG. 10, a storage device 1058 can be adapted to store supplementary data and/or software modules used by the processor. For example, the storage device 1058 can store historical data and other related data as mentioned above regarding the present disclosure. Additionally, or alternatively, the storage device 1058 can store historical data similar to historical network data similar to the disclosed network of the present disclosure. The storage device 1058 can include a hard drive, an optical drive, a thumb-drive, an array of drives, or any combinations thereof.

The system can be linked through the bus 1056 optionally to a display interface (not shown) adapted to connect the system to a display device (not shown), wherein the display device can include a computer monitor, camera, television, projector, or mobile device, among others.

The node 1011 can include a power source 1054, depending upon the application the power source 1054 may be optionally located outside of the node 1011. Linked through bus 1056 can be a user input interface 1057 adapted to connect to a display device 1048, wherein the display device 1048 can include a computer monitor, camera, television, projector, or mobile device, among others. A printer interface 1059 can also be connected through bus 1056 and adapted to connect to a printing device 1032, wherein the printing device 1032 can include a liquid inkjet printer, solid ink printer, large-scale commercial printer, thermal printer, UV printer, or dye-sublimation printer, among others. A network interface controller (NIC) 1034 is adapted to connect through the bus 1056 to a network 1036, wherein data or other data, among other things, can be rendered on a third party display device, third party imaging device, and/or third party printing device outside of the node 1011.

Still referring to FIG. 10, the data or other data, among other things, can be transmitted over a communication channel of the network 1036, and/or stored within the storage system 1058 for storage and/or further processing. Further, the data or other data may be received wirelessly or hard wired from a receiver 1046 (or external receiver 1038) or transmitted via a transmitter 1047 (or external transmitter 1039) wirelessly or hard wired, the receiver 1046 and transmitter 1047 are both connected through the bus 1056. Further, a GPS 1001 may be connected via bus 1056 to the node 1011. The node 1011 may be connected via an input interface 1008 to external sensing devices 1044 and external input/output devices 1041. The node 1011 may be connected to other external computers 1042. An output interface 1009 may be used to output the processed data from the processor 1040.

The above-described embodiments of the present disclosure can be implemented in any of numerous ways. For example, the embodiments may be implemented using hardware, software or a combination thereof. Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

What is claimed is:

1. A method for determining scheduling for packet transmission in a convergecast network, the convergecast network including a sink-node and a plurality of nodes, wherein during an operation in the convergecast network, each node generates packets to transmit to the sink-node, and a receiver of the sink-node receives information indicative of a topology of the convergecast network that includes a tree having one or more branches, and each node in the tree is associated with a hop count for a route to the sink-node through a specific branch, the method comprising:

receiving a request to perform an operation in the convergecast network;

initializing a query from the sink-node, the query is transmitted to the plurality of nodes through the branches, and in response to the query, the receiver receives information indicative at a period of time, such that the information includes a topology of the convergecast network, properties of each node and time data for each node generated indicative of a data generation release time from each node and a data delivery time at the sink-node for each node;

sorting the plurality of nodes by the sink-node based on the received information and using a sorting function that prioritizes each node to obtain a prioritized order of the plurality of nodes;

calculating an end-to-end delay for each node based on the time data by determining a difference between the data generation release time for each node and the data delivery time at the sink-node for each node;

scheduling packet transmission for each of the plurality of nodes by the sink-node based on a scheduling function having a set of predetermined scheduling criteria, so as to obtain a scheduled order for the plurality of nodes, wherein the scheduling function includes computing a generating time difference for each node from the time data between a holding time of an oldest packet of the node and a holding time of an oldest packet held by the node's associated child nodes, such that if the generating time difference is above a predetermined time threshold, then, the oldest packet held by the node's associated child node is scheduled by the sink node to transmit the packet from the child node; and performing packet transmissions in the tree using the scheduled order, wherein performing the operation using the scheduled order substantially optimizes the operation by reducing a total number of timeslots required to complete the operation and by reducing an amount of end-to-end delay for the plurality of nodes in the convergecast network.

2. The method of claim 1, wherein the sorting function and the end-to-end delay are simultaneously or jointly performed.

3. The method of claim 1, wherein the sorting function prioritizes each node to obtain a prioritized order of the plurality of nodes based on an amount of total load, an amount of load to be forwarded, an amount of load remaining after forwarding, a prioritization of a node or some combination thereof.

4. The method of claim 1, wherein the sorting function prioritizes the plurality of nodes based on a total load or a remaining load, wherein the total load includes a number of packets to be transmitted by each node, a number of packets to be forwarded by each node, or both, in a period of time, along with including any previous transmitted packets by each node, any previous forwarded packets by each node, or both, in a period of time, wherein the remaining load is a number of packets each node transmits, forwards, or both, in a remaining of the period of time.

5. The method of claim 4, wherein the sorting function includes a variant implementation function, such that the variant implementation function includes:

dividing the plurality of nodes into a first group including child nodes of the sink node, and a second group that includes other nodes except the child nodes of the sink node; and sorting the first group and the second group based on a predetermined metric, such that the first group is prioritized over the second group.

6. The method of claim 1, further comprising:
a scheduling matrix $$S \in \{-L, -L+1, \ldots, L-1, L\}^{M \times (N+1)},$$

wherein (L) is a number of frequency channels, (M) is a schedule size, (N) is a number of nodes, (+) is transmits and (−) is receives, wherein child nodes of the sink-node have a higher priority over other nodes of the plurality of nodes regarding transmitting or receiving, such that each child node of the sink-node is sorted by a remaining load and each other node of the other nodes is sorted by a total load, wherein the total load includes a number of packets to be transmitted by each node, a number of packets to be forwarded by each node, or both, in a period of time, along with including any previous transmitted packets by each node, any previous forwarded packets by each node, or both, in a period of time, wherein the remaining load is a number of packets each node transmits, forwards, or both, in a remaining of the period of time.

7. The method of claim 1, wherein the operation starts when a packet is generated from any node of the plurality of the nodes.

8. The method of claim 1, further comprising:
obtaining a hop-count to the sink-node for each node in the plurality of the nodes prior to scheduling the packet transmissions.

9. The method of claim 1, wherein each node in the plurality of nodes can be in one of the following states during each timeslot of the operation:

a receiving state, during which the node may receive a packet from a neighboring node;

a transmitting state, during which the node may transmit a packet to a neighboring node; and an idle state, during which the node neither transmits nor receives.

10. The method of claim 1, wherein the convergecast network is a wireless sensor network.

11. The method of claim 1, wherein the set of predetermined scheduling criteria of the scheduling function includes at least one of a generating time of the packet, a buffer status of a node, a buffer status of a child node and a buffer status of a parent of the node.

12. The method of claim 1, wherein the scheduling function includes:

computing a systematic threshold considering buffer status of associated child nodes' and buffer status of associated parent nodes', such that receive packets from an associated child node or transmit packets to associated parent node, wherein as the buffer of the parent node is filled with more packets, the threshold is decreased, so that a node is scheduled by the sink node to receive packets from its associated child node.

13. The method of claim 12, wherein the buffer of the node is filled with more packets, the threshold is increased, so that the node is scheduled by the sink node to transmit its packets inside of the buffer to its associated parent node, wherein, as buffers of the node and its associated parent node
are simultaneously filled with more packets, the sink node prevents the node from transmitting or receiving operation.

14. The method of claim 1, wherein the tree for the convergecast network is obtained by:

broadcasting a message from the sink-node to all one-hop neighbors or child nodes of the sink-node;

propagating the message to each node in the plurality of the nodes through forwarding a received copy of the message with a smaller hop-count; and obtaining a shortest-hop-count tree to form the tree.

15. A non-transitory computer-readable storage medium storing instructions that when executed by a computer cause the computer to perform a method for optimizing packet transmission during an operation in a convergecast network, the convergecast network including a sink-node and a plurality of nodes, wherein during an operation in the convergecast network, each node generates packets to transmit to the sink-node, and a receiver of the sink-node receives information indicative of a topology of the convergecast network that includes a tree having one or more branches, and each node in the tree is associated with a hop count for a route to the sink-node through a specific branch, the method comprising:

receiving a request to perform an operation in the convergecast network;

initializing a query from the sink-node, the query is transmitted to the plurality of nodes through the branches, and in response to the query, the receiver receives information indicative at a period of time, such that the information includes a topology of the convergecast network, properties of each node and time data for each node that is generated indicative of a data generation release time from each node and a data delivery time at the sink-node for each node;

sorting the plurality of nodes by the sink-node based on the received information and using a sorting function that prioritizes each node to obtain a prioritized order of the plurality of nodes;

calculating an end-to-end delay for each node based on the time data by determining a difference between the data generation release time for each node and the data delivery time at the sink-node for each node;

scheduling packet transmission for each of the plurality of nodes by the sink-node based on a scheduling function having a set of predetermined scheduling criteria, so as to obtain a scheduled order for the plurality of nodes, wherein the scheduling function includes computing a generating time difference for each node from the time data between a holding time of an oldest packet of the node and holding times of oldest packets held by the node's associated child nodes, such that if the generating time differences are above a predetermined time threshold, then the oldest packets held by the node's associated child nodes are scheduled by the sink node to transmit the packets from the child node; and performing packet transmissions in the tree using the scheduled order, wherein the scheduled order substantially optimizes the operation by reducing a total number of timeslots required to complete the operation with reducing an amount of end-to-end delay for the plurality of nodes in the convergecast network, wherein a timeslot specifies an amount of time.

16. The method of claim 15, wherein the sorting function prioritizes the plurality of nodes based on a total load or a remaining load,
   wherein the total load includes a number of packets to be transmitted by each node, a number of packets to be forwarded by each node, or both, in a period of time, along with including any previous transmitted packets by each node, any previous forwarded packets by each node, or both, in a period of time,
   wherein the remaining load is a number of packets each node transmits, forwards, or both, in a remaining of the period of time.

17. The method of claim 15, wherein the sorting function includes a variant implementation function, such that the variant implementation function includes:
   dividing the plurality of nodes into a first group including child nodes of the sink node, and a second group that includes other nodes except the child nodes of the sink node;
   sorting the first group and the second group on a predetermined metric, such that the first group is prioritized over the second group.

18. A device that optimizes packet transmission during an operation in a convergecast network, the convergecast network including a sink-node and a plurality of nodes, wherein during the operation in the convergecast network, each node generates packets to transmit to the sink-node, and a receiver of the sink-node receives information indicative of a topology of the convergecast network that includes a tree having one or more branches, and each node in the tree is associated with a hop count for a route to the sink-node through a specific branch, the device comprising:
   a receiver configured to receive a request to perform the operation in the convergecast network;
   a processor of the sink-node is configured to:
      initialize a query to broadcast to the plurality of nodes through the branches, and in response to the query, the receiver receives information indicative at a period of time,
   wherein the information includes a topology of the convergecast network, properties of each node and time data for each node that is generated indicative of a data generation release time from each node and a data delivery time at the sink-node for each node;
      sort the plurality of nodes by the sink-node based on the received information and using a sorting function that prioritizes each node to obtain a prioritized order of the plurality of nodes;
      calculate an end-to-end delay for each node based on the time data by determining a difference between the data generation release time for each node and the data delivery time at the sink-node for each node;
      schedule packet transmission for each of the plurality of nodes by the sink-node based on a scheduling function having a set of predetermined scheduling criteria, so as to obtain a scheduled order for the plurality of nodes, wherein the scheduling function includes computing a generating time difference for each node from the time data between a holding time of an oldest packet of the node and holding times of oldest packets held by the node's associated child nodes, such that if the generating time differences are above a predetermined time threshold, then the oldest packets held by the node's associated child nodes are scheduled by the sink node to transmit the packets from the child node; and
      perform packet transmissions in the tree using the scheduled order, wherein the scheduled order substantially optimizes the operation by reducing a total number of timeslots required to complete the operation with reducing an amount of end-to-end delay for the plurality of nodes in the convergecast network.

* * * * *